(12) United States Patent
Campbell et al.

(10) Patent No.: US 9,747,270 B2
(45) Date of Patent: Aug. 29, 2017

(54) NATURAL INPUT FOR SPREADSHEET ACTIONS

(75) Inventors: John Campbell, Renton, WA (US);
Amy Lin, Redmond, WA (US);
Lawrence Waldman, Seattle, WA (US);
Sherman Der, NewCastle, WA (US);
Karen Cheng, Seattle, WA (US);
Christopher Doan, Redmond, WA (US); Thomas Constantine, Redmond, WA (US); Chad Rothschiller, Edmonds, WA (US); Yun Ma, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 867 days.

(21) Appl. No.: 12/986,473

(22) Filed: Jan. 7, 2011

(65) Prior Publication Data
US 2012/0180002 A1    Jul. 12, 2012

(51) Int. Cl.
*G06F 3/033* (2013.01)
*G06F 17/24* (2006.01)
*G06F 3/0488* (2013.01)

(52) U.S. Cl.
CPC ........ *G06F 17/246* (2013.01); *G06F 3/04883* (2013.01)

(58) Field of Classification Search
CPC ............................ G06F 3/04883; G06F 17/246
USPC .......................... 715/745, 810, 834, 841, 863
See application file for complete search history.

(56) References Cited

U.S. PATENT DOCUMENTS

| | | |
|---|---|---|
| 5,095,429 A | 3/1992 | Harris et al. |
| 5,212,788 A | 5/1993 | Lomet et al. |
| 5,249,296 A | 9/1993 | Tanaka |
| 5,339,392 A | 8/1994 | Risberg et al. ............... 395/161 |
| 5,371,675 A | 12/1994 | Greif et al. |
| 5,403,639 A | 4/1995 | Belsan et al. |
| 5,418,902 A | 5/1995 | West et al. |
| 5,423,034 A | 6/1995 | Cohen-Levy et al. |
| 5,452,447 A | 9/1995 | Nelson et al. |
| 5,455,945 A | 10/1995 | VanderDrift |
| 5,555,403 A | 9/1996 | Cambot et al. |
| 5,581,670 A | 12/1996 | Bier et al. |

(Continued)

FOREIGN PATENT DOCUMENTS

| | | |
|---|---|---|
| AU | 2006291313 | 7/2011 |
| CA | 2 618 224 | 7/2014 |

(Continued)

OTHER PUBLICATIONS

Office Action dated Apr. 30, 2012, issued in U.S. Appl. No. 11/223,541.

(Continued)

*Primary Examiner* — Nicholas Augustine

(57) ABSTRACT

Different gestures and actions are used to interact with spreadsheets. The gestures are used in manipulating the spreadsheet and performing other actions in the spreadsheet. For example, gestures may be used to move within the spreadsheet, select data, filter, sort, drill down/up, zoom, split rows/columns, perform undo/redo actions, and the like. Sensors that are associated with a device may also be used in interacting with spreadsheets. For example, an accelerometer may be used for moving and performing operations within the spreadsheet.

20 Claims, 13 Drawing Sheets

(56) References Cited

U.S. PATENT DOCUMENTS

| | | | |
|---|---|---|---|
| 5,581,760 A | 12/1996 | Atkinson | |
| 5,604,854 A | 2/1997 | Glassey | |
| 5,613,058 A | 3/1997 | Koppolu et al. | 715/744 |
| 5,664,127 A | 9/1997 | Anderson | |
| 5,669,005 A | 9/1997 | Curbow et al. | |
| 5,694,608 A | 12/1997 | Shostak | |
| 5,708,827 A | 1/1998 | Kaneko et al. | |
| 5,727,161 A | 3/1998 | Purcell, Jr. | |
| 5,745,714 A | 4/1998 | Glass et al. | |
| 5,819,292 A | 10/1998 | Hitz et al. | |
| 5,848,187 A | 12/1998 | Bricklin et al. | |
| 5,852,439 A | 12/1998 | Musgrove et al. | 345/339 |
| 5,883,623 A | 3/1999 | Cseri | |
| 5,890,174 A | 3/1999 | Khanna et al. | |
| 5,893,125 A | 4/1999 | Shostak | 707/511 |
| 5,899,988 A | 5/1999 | Depledge et al. | |
| 5,978,818 A | 11/1999 | Lin | 715/209 |
| 5,987,481 A | 11/1999 | Michelman et al. | |
| 6,003,012 A | 12/1999 | Nick | |
| 6,009,455 A | 12/1999 | Doyle | |
| 6,023,691 A | 2/2000 | Bertrand et al. | |
| 6,038,639 A | 3/2000 | O'Brien et al. | |
| 6,097,391 A | 8/2000 | Wilcox | |
| 6,157,934 A | 12/2000 | Khan et al. | |
| 6,160,549 A | 12/2000 | Touma et al. | |
| 6,199,099 B1 | 3/2001 | Gershman et al. | 709/203 |
| 6,216,138 B1 | 4/2001 | Wells et al. | |
| 6,247,008 B1 | 6/2001 | Cambot et al. | |
| 6,256,651 B1 | 7/2001 | Tuli | |
| 6,269,403 B1 | 7/2001 | Anders | 709/231 |
| 6,298,334 B1 | 10/2001 | Burfield et al. | 705/36 |
| 6,323,846 B1 | 11/2001 | Westerman et al. | |
| 6,360,246 B1 | 3/2002 | Begley et al. | |
| 6,411,313 B1 | 6/2002 | Conlon et al. | |
| 6,460,059 B1 | 10/2002 | Wisniewski | |
| 6,484,186 B1 | 11/2002 | Rungta | |
| 6,490,593 B2 | 12/2002 | Proctor | |
| 6,501,491 B1 | 12/2002 | Brown et al. | 345/853 |
| 6,507,865 B1 | 1/2003 | Hanson et al. | 709/206 |
| 6,578,027 B2 | 6/2003 | Cambot et al. | |
| 6,592,626 B1 | 7/2003 | Bauchot et al. | |
| 6,613,098 B1 | 9/2003 | Sorge et al. | |
| 6,625,603 B1 | 9/2003 | Garg et al. | 707/758 |
| 6,626,959 B1 | 9/2003 | Moise et al. | |
| 6,631,497 B1 | 10/2003 | Jamshidi | |
| 6,631,498 B1 | 10/2003 | McCauley et al. | 715/517 |
| 6,632,249 B2 | 10/2003 | Pollock | 715/513 |
| 6,633,851 B1 | 10/2003 | Engler et al. | |
| 6,651,075 B1 | 11/2003 | Kusters et al. | |
| 6,662,341 B1 | 12/2003 | Cooper et al. | 715/513 |
| 6,691,100 B1 | 2/2004 | Alavi et al. | |
| 6,701,485 B1 | 3/2004 | Igra et al. | 715/210 |
| 6,757,867 B2 | 6/2004 | Bauchot et al. | |
| 6,775,675 B1 | 8/2004 | Nwabueze et al. | |
| 6,801,910 B1 | 10/2004 | Bedell et al. | |
| 6,832,351 B1 | 12/2004 | Batres | 715/505 |
| 6,892,211 B2 | 5/2005 | Hitz et al. | |
| 6,906,717 B2 | 6/2005 | Couckuyt et al. | |
| 6,988,241 B1 | 1/2006 | Guttman et al. | |
| 6,990,632 B2 | 1/2006 | Rothchiller et al. | |
| 6,993,533 B1 | 1/2006 | Barnes | |
| 7,013,312 B2 | 3/2006 | Bala et al. | |
| 7,015,911 B2 | 3/2006 | Shaughnessy et al. | 345/440 |
| 7,017,112 B2 | 3/2006 | Collie et al. | |
| 7,031,979 B2 | 4/2006 | Kauffman | |
| 7,047,380 B2 | 5/2006 | Tormasov et al. | |
| 7,231,657 B2 | 6/2007 | Honarvar et al. | |
| 7,441,197 B2 | 10/2008 | Tschiegg et al. | |
| 7,580,928 B2 | 8/2009 | Wu et al. | |
| 7,584,414 B2 | 9/2009 | Mortensen | |
| 7,640,496 B1 | 12/2009 | Chaulk et al. | 715/243 |
| 7,650,644 B2 | 1/2010 | Cheng et al. | 726/27 |
| 7,657,571 B2 | 2/2010 | Battagin et al. | |
| 7,660,843 B1 | 2/2010 | Atkinson et al. | |
| 7,673,340 B1 | 3/2010 | Cohen et al. | |
| 7,676,763 B2 * | 3/2010 | Rummel | 715/841 |
| 7,680,823 B2 | 3/2010 | Garfinkle et al. | |
| 7,730,425 B2 * | 6/2010 | de los Reyes et al. | 715/835 |
| 7,752,536 B2 | 7/2010 | Megiddo et al. | |
| 7,792,847 B2 | 9/2010 | Dickerman et al. | |
| 7,797,621 B1 | 9/2010 | Danner et al. | |
| 7,805,437 B1 | 9/2010 | Andersson et al. | |
| 7,908,549 B2 | 3/2011 | Khen et al. | |
| 7,949,937 B2 | 5/2011 | Wu et al. | |
| 8,121,975 B2 | 2/2012 | Averbuch et al. | |
| 8,245,156 B2 * | 8/2012 | Mouilleseaux et al. | 715/834 |
| 8,255,789 B2 | 8/2012 | Berger et al. | |
| 8,279,174 B2 * | 10/2012 | Jee et al. | 345/157 |
| 8,321,781 B2 | 11/2012 | Tolle | |
| 8,352,423 B2 | 1/2013 | Phillips et al. | |
| 8,381,133 B2 * | 2/2013 | Iwema et al. | 715/845 |
| 8,468,444 B2 | 6/2013 | Middelfart | |
| 8,549,432 B2 * | 10/2013 | Warner | 715/834 |
| 8,566,953 B2 | 10/2013 | Campbell et al. | |
| 8,601,389 B2 * | 12/2013 | Schulz et al. | 715/786 |
| 8,719,251 B1 | 5/2014 | English et al. | |
| 8,854,433 B1 | 10/2014 | Rafii | |
| 8,943,142 B1 | 1/2015 | Simon et al. | |
| 9,053,083 B2 | 6/2015 | Waldman et al. | |
| 9,171,099 B2 | 10/2015 | Prish et al. | |
| 2001/0055013 A1 | 12/2001 | Fuki | |
| 2002/0010743 A1 | 1/2002 | Ryan et al. | |
| 2002/0015059 A1 | 2/2002 | Clarke | |
| 2002/0065846 A1 | 5/2002 | Ogawa et al. | |
| 2002/0070953 A1 | 6/2002 | Barg et al. | |
| 2002/0077803 A1 | 6/2002 | Kudoh et al. | 704/1 |
| 2002/0077842 A1 | 6/2002 | Charisius et al. | |
| 2002/0078086 A1 | 6/2002 | Alden et al. | |
| 2002/0099824 A1 | 7/2002 | Bender et al. | |
| 2002/0113822 A1 | 8/2002 | Windl et al. | 345/769 |
| 2002/0129054 A1 | 9/2002 | Ferguson et al. | |
| 2002/0143780 A1 | 10/2002 | Gorman | |
| 2002/0158887 A1 | 10/2002 | Samra et al. | 345/619 |
| 2002/0184131 A1 | 12/2002 | Gatto | |
| 2003/0011638 A1 * | 1/2003 | Chung | 345/808 |
| 2003/0016247 A1 | 1/2003 | Lai et al. | |
| 2003/0018644 A1 | 1/2003 | Bala et al. | |
| 2003/0033329 A1 | 2/2003 | Bergman et al. | |
| 2003/0044762 A1 | 3/2003 | Bergan et al. | 434/350 |
| 2003/0051209 A1 | 3/2003 | Androski et al. | 715/503 |
| 2003/0061305 A1 | 3/2003 | Copley et al. | 709/217 |
| 2003/0066030 A1 | 4/2003 | Curns et al. | |
| 2003/0071814 A1 | 4/2003 | Jou et al. | |
| 2003/0088586 A1 | 5/2003 | Fitzpatrick et al. | |
| 2003/0105765 A1 | 6/2003 | Smith et al. | 707/100 |
| 2003/0120999 A1 | 6/2003 | Miller et al. | |
| 2003/0164817 A1 | 9/2003 | Graham et al. | |
| 2003/0169295 A1 | 9/2003 | Becerra, Jr. | |
| 2003/0212960 A1 | 11/2003 | Shaughnessy et al. | |
| 2003/0226105 A1 | 12/2003 | Waldau | |
| 2003/0233257 A1 | 12/2003 | Matian et al. | |
| 2004/0003353 A1 | 1/2004 | Rivera et al. | 715/530 |
| 2004/0006539 A1 | 1/2004 | Royer et al. | |
| 2004/0015783 A1 | 1/2004 | Lennon et al. | |
| 2004/0049465 A1 | 3/2004 | Engler et al. | |
| 2004/0064449 A1 | 4/2004 | Ripley et al. | |
| 2004/0100501 A1 | 5/2004 | Dornback | |
| 2004/0103366 A1 | 5/2004 | Peyton-Jones et al. | |
| 2004/0117731 A1 | 6/2004 | Blyashov | 715/507 |
| 2004/0128147 A1 | 7/2004 | Vallinayagam et al. | |
| 2004/0143788 A1 | 7/2004 | Aureglia et al. | 715/503 |
| 2004/0168115 A1 | 8/2004 | Bauernschmidt et al. | |
| 2004/0174397 A1 | 9/2004 | Cereghini et al. | |
| 2004/0181748 A1 | 9/2004 | Jamshidi et al. | |
| 2004/0199867 A1 | 10/2004 | Brandeborg | 715/500.1 |
| 2004/0205595 A1 | 10/2004 | DelGobbo et al. | |
| 2004/0205638 A1 | 10/2004 | Thomas et al. | |
| 2004/0221233 A1 | 11/2004 | Thielen | |
| 2004/0268364 A1 | 12/2004 | Faraj | 719/316 |
| 2005/0039144 A1 | 2/2005 | Wada et al. | |
| 2005/0044496 A1 | 2/2005 | Kotler et al. | |
| 2005/0049906 A1 | 3/2005 | Leymann et al. | |
| 2005/0068290 A1 | 3/2005 | Jaeger | |
| 2005/0097146 A1 | 5/2005 | Konstantinou et al. | |

(56) References Cited

U.S. PATENT DOCUMENTS

| | | |
|---|---|---|
| 2005/0102608 A1 | 5/2005 | Batres .................... 715/505 |
| 2005/0108052 A1 | 5/2005 | Omaboe |
| 2005/0114661 A1 | 5/2005 | Cheng et al. |
| 2005/0144554 A1 | 6/2005 | Salmon et al. |
| 2005/0165829 A1 | 7/2005 | Varasano |
| 2005/0210389 A1 | 9/2005 | Middelfart |
| 2005/0240985 A1 | 10/2005 | Alkove et al. |
| 2005/0268215 A1 | 12/2005 | Battagin et al. |
| 2005/0275622 A1 | 12/2005 | Patel et al. |
| 2005/0278647 A1* | 12/2005 | Leavitt et al. ............. 715/765 |
| 2005/0289136 A1 | 12/2005 | Wu et al. |
| 2006/0013462 A1* | 1/2006 | Sadikali .................. 382/132 |
| 2006/0069696 A1 | 3/2006 | Becker et al. |
| 2006/0168536 A1 | 7/2006 | Portmann |
| 2006/0265641 A1 | 11/2006 | Garfinkle et al. |
| 2006/0288267 A1 | 12/2006 | DeSpain |
| 2007/0028159 A1 | 2/2007 | Ying et al. |
| 2007/0050416 A1 | 3/2007 | Battagin et al. |
| 2007/0061698 A1 | 3/2007 | Megiddo et al. |
| 2007/0061699 A1 | 3/2007 | Battagin et al. ............ 715/209 |
| 2007/0130517 A1 | 6/2007 | Wu .......................... 715/530 |
| 2007/0136653 A1 | 6/2007 | Khen et al. |
| 2007/0176898 A1* | 8/2007 | Suh ............................ 345/158 |
| 2008/0010670 A1 | 1/2008 | Campbell et al. ............. 726/3 |
| 2008/0036743 A1* | 2/2008 | Westerman et al. ........... 345/173 |
| 2008/0046803 A1 | 2/2008 | Beauchamp et al. |
| 2008/0204476 A1 | 8/2008 | Montague |
| 2008/0235352 A1 | 9/2008 | Yolleck et al. |
| 2008/0270886 A1 | 10/2008 | Gossweiler et al. |
| 2008/0271127 A1 | 10/2008 | Naibo et al. |
| 2008/0294751 A1 | 11/2008 | Dreiling |
| 2008/0307385 A1 | 12/2008 | Dreiling |
| 2009/0083619 A1 | 3/2009 | Davis |
| 2009/0100360 A1 | 4/2009 | Janzen et al. |
| 2009/0198683 A1 | 8/2009 | Robertson et al. |
| 2009/0217147 A1 | 8/2009 | Thomsen |
| 2009/0254572 A1 | 10/2009 | Redlich et al. |
| 2009/0300544 A1 | 12/2009 | Psenka et al. |
| 2009/0307623 A1 | 12/2009 | Agarawala et al. |
| 2009/0309849 A1* | 12/2009 | Iwema et al. ................. 345/173 |
| 2009/0313268 A1 | 12/2009 | Folting et al. |
| 2009/0327964 A1* | 12/2009 | Mouilleseaux et al. ....... 715/834 |
| 2009/0328010 A1 | 12/2009 | Cao |
| 2010/0031152 A1 | 2/2010 | Villaron et al. |
| 2010/0031167 A1 | 2/2010 | Roytman |
| 2010/0077344 A1 | 3/2010 | Gaffney |
| 2010/0094658 A1 | 4/2010 | Mok et al. |
| 2010/0100854 A1 | 4/2010 | Russell et al. |
| 2010/0131529 A1 | 5/2010 | Kasera et al. |
| 2010/0192103 A1* | 7/2010 | Cragun et al. ............... 715/834 |
| 2010/0214322 A1 | 8/2010 | Lim et al. |
| 2010/0262900 A1 | 10/2010 | Romatier et al. |
| 2010/0318890 A1 | 12/2010 | Billharz |
| 2010/0325526 A1 | 12/2010 | Ellis et al. |
| 2011/0041087 A1 | 2/2011 | Leveille et al. |
| 2011/0074699 A1 | 3/2011 | Marr et al. |
| 2011/0087954 A1 | 4/2011 | Dickerman et al. |
| 2011/0145299 A1 | 6/2011 | Zhou |
| 2011/0145689 A1 | 6/2011 | Campbell et al. |
| 2011/0154268 A1* | 6/2011 | Trent et al. .................. 715/863 |
| 2011/0163968 A1 | 7/2011 | Hogan |
| 2011/0283176 A1 | 11/2011 | Zulian |
| 2011/0320563 A1 | 12/2011 | Seo |
| 2012/0013539 A1 | 1/2012 | Hogan et al. |
| 2012/0013540 A1* | 1/2012 | Hogan ........................ 345/173 |
| 2012/0023449 A1 | 1/2012 | Zabielski |
| 2012/0072820 A1 | 3/2012 | Weinman, Jr. |
| 2012/0173963 A1 | 7/2012 | Hoke et al. |
| 2012/0212438 A1 | 8/2012 | Vaisanen |
| 2012/0221933 A1 | 8/2012 | Heiney et al. |
| 2012/0226967 A1 | 9/2012 | Oh |
| 2012/0254782 A1 | 10/2012 | Van Ieperen et al. |
| 2012/0254783 A1 | 10/2012 | Pourshahid et al. |
| 2012/0272192 A1 | 10/2012 | Grossman et al. |
| 2012/0330955 A1 | 12/2012 | Miura |
| 2013/0013993 A1 | 1/2013 | Oh |
| 2013/0061122 A1 | 3/2013 | Sethi et al. |
| 2013/0111320 A1 | 5/2013 | Campbell et al. |
| 2013/0117651 A1 | 5/2013 | Waldman et al. |
| 2013/0159833 A1 | 6/2013 | Look et al. |
| 2013/0198323 A1 | 8/2013 | Prish et al. |
| 2013/0229373 A1 | 9/2013 | Eriksson et al. |
| 2013/0339903 A1 | 12/2013 | Cheng et al. |
| 2014/0019842 A1 | 1/2014 | Montagna et al. |
| 2014/0032575 A1 | 1/2014 | Kiang et al. |
| 2014/0033093 A1 | 1/2014 | Brauninger et al. |
| 2014/0310649 A1 | 10/2014 | Bernstein et al. |
| 2014/0358733 A1 | 12/2014 | Achuthan et al. |
| 2014/0372856 A1 | 12/2014 | Radakovitz et al. |
| 2014/0372858 A1 | 12/2014 | Campbell et al. |
| 2014/0372932 A1 | 12/2014 | Rutherford et al. |
| 2015/0347372 A1 | 12/2015 | Waldman et al. |
| 2016/0041964 A1 | 2/2016 | Prish et al. |

FOREIGN PATENT DOCUMENTS

| | | |
|---|---|---|
| CA | 2616563 | 5/2015 |
| CN | 1578949 A | 2/2005 |
| CN | 1655120 A | 8/2005 |
| CN | 1877505 A | 12/2006 |
| CN | 101258485 A | 9/2008 |
| CN | 101300564 A | 11/2008 |
| CN | 101326520 A | 12/2008 |
| CN | 101933388 A | 3/2011 |
| EP | 0798655 | 1/1997 |
| EP | 0 990 972 A1 | 4/2000 |
| EP | 1037157 A1 | 9/2000 |
| EP | 1 367 514 | 3/2003 |
| EP | 1 603 053 A2 | 7/2005 |
| EP | 1 922 939 | 5/2008 |
| JP | 03-268185 A | 11/1991 |
| JP | 06-028349 A | 2/1994 |
| JP | 07-334696 A | 12/1995 |
| JP | 8-500200 | 1/1996 |
| JP | 10-508403 A | 8/1998 |
| JP | H11-143606 A | 5/1999 |
| JP | 2001-092444 A | 4/2001 |
| JP | 2001-109741 | 4/2001 |
| JP | 2001-312442 | 11/2001 |
| JP | 2002-140159 A | 5/2002 |
| JP | 2003-108440 | 2/2003 |
| JP | 2003-108440 | 4/2003 |
| JP | 2003-281128 | 10/2003 |
| JP | 2003-533755 | 11/2003 |
| JP | 2004-145713 | 5/2004 |
| JP | 2006-048110 A | 2/2006 |
| JP | 2007-511002 A | 4/2007 |
| JP | 2008-059010 A | 3/2008 |
| JP | 2008-123199 A | 5/2008 |
| JP | 2009-508237 A | 2/2009 |
| JP | 2010-152801 A | 7/2010 |
| JP | 2010-170573 A | 8/2010 |
| KR | 10-2009-0007365 | 1/2009 |
| KR | 10-2009-0013551 | 2/2009 |
| KR | 10-2009-0017517 | 2/2009 |
| KR | 10-2009-0116591 | 11/2009 |
| KR | 10-2010-0096424 | 9/2010 |
| KR | 10-2011-0139649 | 12/2011 |
| MX | 278251 | 8/2010 |
| RU | 2383923 | 3/2010 |
| RU | 2 390 834 C2 | 5/2010 |
| RU | 2 419 853 C2 | 5/2011 |
| RU | 2 433 449 C2 | 10/2011 |
| SG | 117587 | 12/2007 |
| TW | 1416342 | 11/2013 |
| TW | TA 1416342 | 11/2013 |
| WO | WO 97/07454 A1 | 2/1997 |
| WO | WO 00/72197 A2 | 11/2000 |
| WO | WO 0146868 A2 | 6/2001 |
| WO | WO 02/03595 | 1/2002 |
| WO | WO 02/084531 A2 | 10/2002 |
| WO | WO 2007/032907 | 3/2007 |

(56) References Cited

FOREIGN PATENT DOCUMENTS

| WO | WO 2007/061057 A1 | 5/2007 |
|----|----|----|
| WO | 2010/065664 A1 | 6/2010 |
| WO | 2010/071630 A1 | 6/2010 |

OTHER PUBLICATIONS

PCT Search Report dated Oct. 25, 2012 in Appln No. PCT/US2012/026672.
Quixa, Builder/Quixa Solutions, http://www.guixa.com/ultimus/builder.asp, 2005, 4 pgs.
Smedley, T.J., et al., "Expanding the utility of spreadsheets through the integration of visual programming and user interface objects," The ACM Digital Library, 1996, 148-155.
Truvé, S., "Dynamic what-if analysis: exploring computational dependencies with slidercells and micrographs," Mosaic of Creativity, 1995,280-281.
"WP01:WebSphere MQ Workflow-Performance Estimates and Capacity Assessments", http://www.1.ibm.com/suggort/docview.wss?rs= 171 &uid=swg24006573&l0c=enUS&cs=ytu-8&lang=en, 2 pgs.
Office Action dated Jan. 8, 2008, issued in U.S. Appl. No. 11/214,676.
Office Action dated Jul. 2, 2008, issued in U.S. Appl. No. 11/214,676.
Office Action dated Nov. 21, 2008, issued in U.S. Appl. No. 11/214,676.
Office Action dated Nov. 26, 2008, issued in U.S. Appl. No. 11/223,180.
Office Action dated Mar. 30, 2009, issued in U.S. Appl. No. 11/298,380.
Office Action dated Apr. 23, 2009, issued in U.S. Appl. No. 11/223,180.
Office Action dated Jun. 1, 2009, issued in U.S. Appl. No. 11/214,676.
Office Action dated Sep. 1, 2009, issued in U.S. Appl. No. 11/223,180.
Office Action dated Sep. 14, 2009, issued in U.S. Appl. No. 11/298,380.
Office Action dated Mar. 2, 2010, issued in U.S. Appl. No. 11/298,380.
Office Action dated Feb. 13, 2013, issued in U.S. Appl. No. 13/289,663.
Office Action dated Nov. 6, 2013, issued in U.S. Appl. No. 13/289,663.
Office Action dated Sep. 25, 2012, issued in U.S. Appl. No. 11/223,541.
ISR Search Report dated Jul. 31, 2012 cited in Appln No. PCT/US2012/020192.
Chinese Office Action dated Jan. 6, 2014 in Appln No. 201210012142.0.
Office Action dated Dec. 20, 2013, issued in U.S. Appl. No. 11/223,541.
Chinese Office Action dated Jan. 6, 2014 in Appln No. 201210012142.0, 10 pgs.
Person, R.; "Special Edition Using Microsoft Excel '97"; © 1997 Que Corp., pp. 385-410.
Office Action dated Apr. 22, 2013, issued in U.S. Appl. No. 11/223,541.
Malaysia Substantive Examination Report dated Jan. 15, 2014 in Appln No. PI 20080503, 3 pgs.
U.S. Appl. No. 11/223,541, filed Sep. 9, 2005, entitled "Named Object View of Electronic Data Report".
U.S. Appl. No. 11/860,394, filed Sep. 24, 2007, entitled "Named Object View of Electronic Data Report".
U.S. Appl. No. 13/035,689, filed Feb. 25, 2011 entitled "Names Object View Over Multiple Files".
Blattner, "Special Edition Using Microsoft Excel 2003"; Que, published Sep. 11, 2003, pp. 16, 47-51, 350-369 and 445-447, 30 pgs.
Brain Matter [Online], AlphaBlox, Apr. 5, 2001 [Retrieved on Sep. 7, 2006]. Retrieved from <URL:http://web.archive.org/web/20010405152714/www.blox.com/?id=sheet>.
Brain Matter [Online], AlphaBlox, Jul. 22, 2001 [Retrieved on Sep. 7, 2006]. Retrieved from <URL:http://web.archive.org/web/20010818124342/www.blox.com/products?subsection=spreadhseets>.
Curie, D., "The Medium Is the Message: Data Downlink's.xls Lets Number Stay Numbers," Online, Nov.-Dec. 1997, vol. 21, No. 6, p. 64, 66.
"Data Warehouse Trend, Part 2 OLAP is enabled on WWW Browser, formulation/operation of data warehouse becomes easy and enlargement of user target is accelerated"; NIKKEI Computer, No. 440, pp. 224-227; Nikkei Business Publications, Inc., Japan, Mar. 30, 1998.
"How to: Save a Workbook as a Web Page in Excel 2002; Summary," Retrieved from the Internet: http://support.microsoft.com/default.aspx?scid=kb;en-us;289260, Retrieved on Dec. 12, 2005, 3 pgs.
Levin, Carol, "Skinny Clients to Rule on Web—Corporate Intranets Will Fuel a New Breed of Applications," PC Magazine, Mar. 26, 1996, vol. 15, No. 6, p. 37.
McManus, Sean, "Excel Everywhere for HTML: Transform Static Excel Spreadsheets Into Smart Interactive Web Pages," Internet Magazine, Mar. 2004, No. 115, p. 106.
"Object Lens: A Spreadsheet for Cooperative Work; Abstract," by Kum-Yew Lai, et al., Sep. 1988, Retrieved from the Internet: https://hpds1.mit.edu/bitstream/1721.1/2210/1/SWP-2053-21290214.pdf, Retrieved on Dec. 12, 2005, 42 pgs.
Powell, Jim, "Add-Ins Turn App Docs Into Web Pages: Microsoft Internet Assistant Tools," Windows Magazine, Jun. 1, 1996, vol. 7, No. 6, p. 120.
Stinson, C., Microsoft Office Excel 2003, Sep. 3, 2003, Microsoft Press, pp. 1-7.
"Welcome to Gnumeric!" Retrieved from the Internet: http://www.gnome.org/projects/gnumeric/, Retrieved on Dec. 12, 2005, 2 pgs.
"XESS The Advanced X Windows Spreadsheet System," Retrieved from the Internet: http://www.ais.com/Xess/xess5_product_sheet.html, Retrieved on Dec. 12, 2005, 3 pgs.
Zhao, J.J., "Developing Web-Enabled Interactive Financial Tools Without HTML and Script Languages," Information Technology, Learning, and Performance Journal, Fall 2001, vol. 19, No. 2, p. 49-53.
New Zealand Examination Report cited in Appln No. 540420 dated Jun. 7, 2005.
Australian Examination Report dated May 29, 2007, cited in Appln No. SG 200503164-6 dated May 29, 2007.
International Search Report dated Aug. 21, 2007, issued in EP 05104560; 3 pgs.
Mexican Office Action cited in Appl No. MX/a/2008/03318, dated Aug. 17, 2010, 3 pgs.
Japanese Notice of Rejection cited in Appln No. 2008-530095 dated Jan. 31, 2012.
Office Action dated Nov. 19, 2008, issued in U.S. Appl. No. 11/223,541.
Office Action dated May 26, 2009, issued in U.S. Appl. No. 11/223,541.
Office Action dated Jan. 20, 2010, issued in U.S. Appl. No. 11/223,541.
Office Action dated Sep. 15, 2010, issued in U.S. Appl. No. 11/223,541.
Office Action dated Dec. 8, 2010, issued in U.S. Appl. No. 11/860,394.
Office Action dated Mar. 2, 2011, issued in U.S. Appl. No. 11/223,541.
Office Action dated Jun. 17, 2011, issued in U.S. Appl. No. 11/860,394.
Office Action dated Jun. 23, 2011, issued in U.S. Appl. No. 11/223,541.

(56) References Cited

OTHER PUBLICATIONS

Office Action dated Oct. 7, 2011, issued in U.S. Appl. No. 11/223,541.
Office Action dated Nov. 8, 2011, issued in U.S. Appl. No. 11/860,394.
Office Action dated Apr. 20, 2012, issued in U.S. Appl. No. 11/860,394.
PCT Search Report dated Jan. 9, 2007 in Appln No. PCT/US2006/034312.
Chinese Office Action dated May 22, 2009, cited in Appln No. 200680032787.3.
Chinese Office Action dated Jul. 24, 2009, cited in Appln No. 200680031441.1.
Australian Examination Report dated Oct. 22, 2009, cited in Appln No. 2006284595.
Chinese Second Office Action dated Nov. 13, 2009, cited in Appln No. 200680032787.3.
Russian Office Action dated Jul. 29, 2010, cited in Appln No. 2008107762.
Chinese Second Office Action dated Feb. 5, 2010, cited in Appln No. 200680031441.1.
Mexican Office Action dated Jul. 14, 2010, cited in Appl No. MX/a/2008/002501.
Russian Office Action dated Sep. 6, 2010, cited in Appln No. 2008108999.
Russian Office Action dated Sep. 22, 2010, cited in Appln No. 2008108992.
Australian Examination Report dated Oct. 26, 2010 cited in Appln No. 2006291313.
Australian Examination Report dated Oct. 29, 2010 cited in Appln No. 2006287357.
Mexican Office Action dated Dec. 8, 2010, cited in Appl No. MX/a/2008/003318.
New Zealand Examination Report dated Jan. 20, 2011 cited in Appln No. 566309.
Japanese Notice of Rejection dated Apr. 22, 2011 cited in Appln No. 2008-529328.
New Zealand Examination Report dated May 5, 2011 cited in Appln No. 566309.
New Zealand Examination Report dated Sep. 9, 2011 cited in Appln No. 594997.
Mexican Office Action dated Oct. 4, 2011 in Appln No. Mx/a/2008/003309.
Japanese Notice of Rejection dated Feb. 3, 2012 cited in Appln No. 2008-530243.
European Search Report dated Feb. 27, 2012 in Appl No. PCT/US2006/034312.
Mexican Office Action dated Apr. 27, 2012, cited in Appl No. MX/a/2008/003318.
Japanese Final Notice of Rejection dated Dec. 7, 2012 in Appln No. 2008-530095.
New Zealand Further Examination Report dated Dec. 14, 2012 cited in Appln No. 594997.
Canadian Office Action dated Dec. 17, 2012 in Appln No. 2,618,211.
Korean Preliminary Rejection dated Jan. 13, 2013 in Appln No. 10-2008-7004303.
Mexican Office Action dated Feb. 11, 2013 in Appln No. Mx/a/2008/003309.
International Search Report mailed Mar. 22, 2013, issued in PCT/US2012/063133.
Mexican Office Action dated May 6, 2013, cited in Appl No. MX/a/2008/003318.
Canadian Office Action dated May 13, 2013 in Appln No. 2,618,224.
PCT Application PCT/US2013/022824, International Search Report mailed May 30, 2013, 10 pages.
Author Unknown, About Dynamic Data Exchange—Published Date: Sep. 6, 2011, 5 pgs; http://msdn.microsoft.com/en-us/library/windows/desktop/ms648774%28v=vs.85%29.aspx Dynamic Data Exchange Protocol.
Battagin, Dan, Using Excel Web Services in a SharePoint Web Part—Published Date: 2006-11-#, 8 pgs; http://msdn.microsoft.com/en-us/library/aa973804%28v=office.12%29.aspx.
"Cologo: A Collaborative Web-based Programming Environment", Published on: Sep. 5, 2011, Available at: http://www.cologo-lang.org/docs_starting.html.
Dodge, et al., Microsoft Office Excel 2003; Official Manual, the first edition, Nikkei BP Soft Press, Inc., Jul. 12, 2004, pp. 129-135 and 387-392.
Dovico™ Software, "Investing in Better Time & Expense Gathering", Jun. 2005, http://www .dovico.com/documents/Investing-in-Better-Time-Expense-Gathering.pdf; 11 pgs.
Entology, "Large Diversified Manufacturer Achieves Sarbanes-Oxley Compliance through Financial Document Management", http://www.entologv.com/Dress/cs/cs_029.htm, 2003, 2 pgs.
Fox, Pamela, How to Convert a Google Spreadsheet into JSON, XML, and MySQL—Published Date: May 17, 2009; 7 pgs; http://blog.pamelafox.org/2009/05/how-to-convert-google-spreadsheet-into.html.
Granet, V., "The Xxl Spreadsheet Project"; Linux Journal, 1999, http:// www.;inuxjournal.com/article/3186; downloaded Sep. 21, 2005; 10 pgs.
Google.com; "Getting Started with Spreadsheets Gadgets", accessed Oct. 20, 2011, at: http://code.google.com/apis/spreadsheets/gadgets/; 8 pgs.
Hudson, S.E., "User interface specification using an enhanced spreadsheet model," ACM Transactions on Graphics, 1994, 13(3), 209-239.
Huynh, D.; "Timeline Gadget for Google Spreadsheets", Retrieved on: Sep. 20, 2011, Available at: http://s3.amazonaws.com/iac-production/attachments/28/TimeLine_Gadget_for_Google_Spreadsheets.pdf.
Jones, S.P., "A user-centred approach to functions in Excel," JCEP, 2003, 165-176.
Khor, "Microsoft Office Excel 2003 Preview", Jun. 2003, Microsoft Office Excel 2003 Preview, Microsoft Excel 2003 Technical Articles, Microsoft Corporation Publishing.
Loney et al., "An Overview of Databases and Instances"; In: Oracle Database 10g DBA Handbook, Mar. 24, 2005; Oracle Press; 2 pgs.
Loney et al., "Dynamic Data Replication"; In: Oracle Database 10g DBA Handbook, Mar. 24, 2005; Oracle Press; 2 pgs.
Loney et al., "Oracle Logical Database Structures"; In: Oracle Database 10g DBA Handbook, Mar. 24, 2005; Oracle Press; 16 pgs.
Loney et al., "Overview of Oracle Net"; In: Oracle Database 10g DBA Handbook, Mar. 24, 2005; Oracle Press; 12 pgs.
Mcpherson; Bruce, Serializing Excel Data for Input to any Google Visualization—Published Date: Jan. 26, 2011; 6 pgs; http://www.eggheadcafe.com/tutorials/excel/571d84dc-9fcf-44de-b2ad-005c12372ab3/serializing-excel-data-for-input-to-any-google-visualization.aspx.
Oliver, Andrew C. and Barozzi, Nicola Ken, POI-HSSF and POI-XSSF—Java API to Access Microsoft Excel Format Files—Retrieved Date: Jan. 11, 2012; 2 pgs; http://poi.apache.org/spreadsheet/.
Indian First Examination Report dated Jan. 22, 2014 cited in 1286/DEL/2005, 2 pgs.
Canadian Notice of Allowance dated Apr. 3, 2014 in Appln No. 2,618,224, 2 pgs.
Office Action dated Mar. 24, 2014, issued in U.S. Appl. No. 13/570,071, 46 pgs.
Office Action dated May 22, 2014, issued in U.S. Appl. No. 13/035,689, 60 pgs.
Office Action dated Jul. 7, 2014, issued in U.S. Appl. No. 11/223,541, 30 pgs.
Taiwan Notice of Allowance dated Jul. 30, 2013 in Appln No. 95132059, 3 pgs.
Malaysian Notice of Allowance dated Jun. 13, 2014 in Appln No. PI 20080500, 2 pgs.

(56) References Cited

OTHER PUBLICATIONS

Malaysian Modified Substantive Examination Report dated Aug. 15, 2014 in Appln No. PI 20080396 2 pgs.
Office Action dated Oct. 8, 2014, issued in U.S. Appl. No. 13/570,071, 14 pgs.
U.S. Appl. No. 14/731,023, filed Jun. 4, 2015 entitled "Interaction Between Web Gadgets and Spreadsheets".
Malaysia Modified Substantive Examination Report dated Feb. 13, 2015 in Appln No. PI 20080396, 2 pgs.
Chinese Third Office Action and Search Report Issued in Patent Application No. 201210012142.0, Mailed Date: May 18, 2015, 13 Pages.
Chinese Second Office Action Issued in Patent Application No. 201210434821.7, Mailed Date: Jun. 19, 2015, 8 Pages.
EP Extended Search Report dated Jul. 16, 2015 in Appln No. PCT/US2012/063133, 9 pgs.
Andrews et al., "Liquid Diagrams: Information Visualization Gadgets"; Information Visualization (IV), 2010 14th International Conference, IEEE, Jul. 26, 2010; pp. 104-109.
Notice of Allowance dated Jun. 25, 2015, issued in U.S. Appl. No. 13/570,071, 22 pgs.
Chinese Office Action and Search Report Issued in Patent Application No. 201210434821.7, Mailed Date: Oct. 27, 2014, 13 Pages.
Chinese Second Office Action Issued in Patent Application No. 201210012142.0, Mailed Date: Nov. 4, 2014, 6 Pages.
Office Action dated Nov. 19, 2014, issued in U.S. Appl. No. 13/035,689, 31 pgs.
Notice of Allowance dated Feb. 6, 2015, issued in U.S. Appl. No. 13/289,663, 57 pgs.
Office Action dated Mar. 26, 2015 issued in U.S. Appl. No. 13/035,689, 24 pgs.
U.S. Appl. No. 14/920,277, filed Oct. 22, 2015 entitled "System and Method for Providing Calculation Web Services for Online Documents".
Malaysia Substantive Examination Report dated Jul. 15, 2015 in Appln No. PI 20080503, 2 pgs.
India First Examination Report dated Sep. 30, 2015 cited in 1943/DELNP/2008, 3 pgs.
India First Examination Report dated Oct. 9, 2015 cited in 1575/DELNP/2008, 3 pgs.
Chinese Notice of Grant dated Nov. 27, 2015 in Appln No. 201210012142.0, 4 pgs.
Chinese Third Office Action Issued in Patent Application No. 201210434821.7, Mailed Date: Dec. 17, 2015, 10 Pages.
Russian Office Action dated Dec. 18, 2015 in Appln No. 2412-197167, 5 pgs.
PCT International Preliminary Report on Patentability Issued in PCT Application No. PCT/US2013/022824, Mailed Date: Aug. 7, 2014, 6 Pages.
Japanese Notice of Rejection Issued in Patent Application No. 2013-548479, Mailed Date: Jan. 26, 2016, 9 Pages.
Chinese Office Action and Search Report Issued in Patent Application No. 201380007011.6, Mailed Date: Feb. 3, 2016, 12 Pages.
Indian Exam Report in Application 1981/DELNP/2008, mailed Apr. 18, 2016, 7 pgs.
Chinese 1st Office Action in Application 201210044546.8, mailed Feb. 24, 2016, 12 pgs.
U.S. Appl. No. 14/731,023, Office Action mailed Apr. 11, 2016, 7 pgs.
European Search Report in Application 06790149.6, mailed Mar. 6, 2012, 12 pgs.
EP Extended Search Report dated Sep. 22, 2015 in Appln No. PCT/US2013/022824, 8 pgs.
Author Unknown, "Use Online Data in Excel 2010 Spreadsheets— How to Geek"; Jan. 6, 2012; Retrieved from http://web.archive.org/web/201020106083121/haap://howtogeek.com/howto/24285/use-online-data-in-excel-2010-spreadsheets; 6 pgs.
Author Unknown, "Trade Like a Geek—One Click Stock Quotes in Excel—Learn How to Learn Excel"; 2009 Pointy Haired Dilbert—Chandoo.org; 6 pgs.
Walkenbach, John.; "Microsoft Office Excel 2007"; Chapters 15, 27, 40; Excel 2007 Bible; Wiley Publishing; 44 pgs.
Office Action dated Sep. 23, 2015 issued in U.S. Appl. No. 13/035,689, 38 pgs.
Australian Office Action Issued in Australian Patent Application No. 2012204477, Mailed Date: Aug. 23, 2016, 3 Pages.
Norwegian Office Action and Search Report in Application 20080596, mailed Oct. 11, 2016, 5 pgs.
Russian Notice of Allowance in Application 2013131022, mailed Jul. 22, 2016, pgs.
U.S. Appl. No. 14/731,023, Notice of Allowance mailed Oct. 31, 2016, 2 pgs.
Japanese Office Action in Application 2014-541110, mailed Sep. 26, 2016, 9 pgs.
Chinese 2nd Office Action in Application 201380007011.6, mailed Nov. 30, 2016, 9 pgs.
U.S. Appl. No. 13/918,871, Office Action mailed Jun. 4, 2015, 18 pgs.
U.S. Appl. No. 13/918,871, Office Action mailed Dec. 18, 2015, 16 pgs.
U.S. Appl. No. 13/918,871, Office Action mailed Oct. 3, 2016, 19 pgs.
PCT International Preliminary Report on Patentability Issued in PCT Application No. PCT/US2014/041071, Mailed Date: Jul. 22, 2015, 6 Pages.
PCT International Preliminary Report on Patentability Issued in PCT Application No. PCT/US2014/041071, Mailed Date: Jul. 7, 2015, 6 Pages.
Schnell, Joshua, "Grid: An Upcoming, Modern Approach to Spreadsheets for iOS Devices", Published on: Aug. 20, 2012, Available at: http://www. macgasm.nel/2012/08/20/grid-an-upcoming-modern-approach-to-spreadsheets-for-ios-devices/, 8 pages.
Lardinois, Frederic, "YC-Backed Grid Reinvents the Spreadsheet for the Tablet Age", Published on: Aug. 8, 2012, Available at: http://techcrunch.com/2012/08108/grid-launch/, 5 pages.
"LiveCode Grid for Mobile Devices", Retrieved on: Apr. 26, 2013, Available at: http://www.runrevplanel.com/index.php?option=com_content&view=article&id=250&1temid=148, 2 pages.
"Grid", Published on: Jul. 12, 2012, Available at: http://www.infragistics.com/products/windows-forms/grid/, 6 pages.
Ramakrishnan, et al., "XcelLog: A Deductive Spreadsheet System", Published on: Sep. 2007, Available at: http://www.cs.sunysb.edu/-cram/Papers/RRW_KER07/paper.pdf, 15 pages.
PCT International Search Report and Written Opinion for PCT/US2014/041071 mailed Sep. 1, 2014, 9 pgs.
U.S. Appl. No. 13/918,904, Office Action mailed Apr. 8, 2015, 23 pgs.
U.S. Appl. No. 13/918,904, Office Action mailed Nov. 20, 2015, 26 pgs.
U.S. Appl. No. 13/918,904, Advisory Action mailed May 5, 2016, 4 pgs.
U.S. Appl. No. 13/918,904, Office Action mailed Oct. 6, 2016, 30 pgs.
Smith, et al., "Analyzing (Social Media) Networks with NodeXL", In Proceedings of the 4th International Conference on Communities and Technologies, Jun. 25, 2009, 9 pgs.
Gibbs, Samuel, "Google Spreadsheets Gains Filtering, One More Reason not to Use Excel", Published on: Mar. 24, 2011, Available at: http://downloadsquad.switched.com/2011/03/24/google-spreadsheets-gains-filtering-one-more-reason-not-to-use/, 8 pgs.
PCT International Search Report and Written Opinion Issued in PCT Application No. PCT/US2014/041276, Mailed Date: Jan. 16, 2015, 17 Pages.
Jelen, Bill, "Microsoft Excel 2010 in Depth", ISBN 9780789744265, published 2010, 11 pgs.
PCT International Preliminary Report on Patentability Issued in PCT Application No. PCT/US2014/041276, Mailed Date: Dec. 23, 2015, 6 pgs.
European Extended Search Report in Application 14737383.1, mailed Dec. 22, 2016, 6 pgs.
Australian Notice of Allowance in Application 2012204477, mailed Oct. 24, 2016, 4 pgs.

(56) References Cited

OTHER PUBLICATIONS

U.S. Appl. No. 14/920,277, Office Action mailed Jan. 6, 2017, 23 pgs.
Australian Office Action in Application 2012204477, mailed Apr. 24, 2016, 3 pgs.
Author Unknown, Using GoogleFinance to Track Stocks on the Australian Securities Exchange (ASX); Ben's Blog; Sep. 18, 2010; 2 pgs.
Blattner et al, "Special Edition Using Microsoft Excel2000", May 3, 1999, Que, pp. 1-13.
Chilean Office Action cited in Appln. No. 1155-2005 dated Jan. 16, 2008, 10 pgs.
Chilean Second Office Action cited in Appln. No. 1155-2005 dated Jun. 23, 2009, 8 pgs.
Chilean Third Office Action cited in Appln. No. 1155-2005 dated Jun. 8, 2010, 11 pgs.
Chinese Office Action cited in Appln. No. 200510075819.5, dated Dec. 14, 2007, 17 pgs.
Chinese Second Office Action cited in Appln. No. 200510075819.5 dated May 30, 2008, 18 pgs.
Chinese Third Office Action cited in Appln. No. 200510075819.5 dated Nov. 7, 2008, 8 pgs.
European Communication in Application 14736166.1, mailed Jan. 22, 2016, 2 pgs.
European Search Report dated Mar. 6, 2012 in Appl. No. 06790149.6, 12 pgs.
International Search Report dated Jan. 8, 2007, issued in PCT Application No. PCT/US2006/033800; 2 pgs.
International Preliminary Report on Patentability Issued for PCT Patent Application No. PCT/US2014/041258, Mailed Date: Aug. 31, 2015, 8 Pages.
International Search Report and Written Opinion for International Application No. PCT/US2012/026672, mailed Oct. 25, 2012, 11 pgs.
International Search Report and Written Opinion Issued for PCT Patent Application No. PCT/US2014/041258, Mailed Date: Feb. 18, 2015, 10 Pages.
International Search Report and Written Opinion Issued for PCT Patent Application No. PCT/US2014/041258, Mailed Date: Jun. 12, 2015, 7 Pages.
Israeli Office Action cited in Appln No. 168621 dated Sep. 22, 2009, 2 pgs.
iWork for iOS—Numbers—Innovative spreadsheets in a few taps, Retrieved on: Apr. 26, 2013, Available at: https://movies.apple.com/ca/apps/iwork/numbers/, 9 pgs.
iWork—Numbers—Create perfect spreadsheets in minutes., Retrieved on: Apr. 26, 2013, Available at: http://www.apple.com/in/iwork/numbers/#spreadsheet, 3 pgs.
Japanese Notice of Rejection in Appln. No. 2005-161 206 dated Oct. 22, 2010.
Loney et al., "Overview of Oracle Net"; In: Oracle Database 10g OBA Handbook, Mar. 24, 2005; Oracle Press; 12 pgs.
Malaysian Office Action cited in Appln. No. PI 20052416, dated Sep. 15, 2010, 3 pgs.
Mexican Second Office Action cited in Appl. No. PNa/2005/005855, dated Nov. 18, 2009, 2 pgs.
New Zealand Examination Report cited in Appln. No. 540420 dated Jun. 7, 2005, 2 pgs.
Office Action dated Apr. 7, 2009, issued in U.S. Appl. No. 10/858,188, 25 pgs.
Office Action dated Feb. 20, 2008, issued in U.S. Appl. No. 10/858,188, 19 pgs.
Office Action dated Jul. 6, 2007, issued in U.S. Appl. No. 10/858,188.
Office Action dated May 15, 2006, issued in U.S. Appl. No. 10/858,188, 19 pgs.
Office Action dated Nov. 21, 2006, issued in U.S. Appl. No. 10/858,188, 19 pgs.
Office Action dated Oct. 29, 2008, issued in U.S. Appl. No. 10/858,188, 26 pgs.
Pembudon et al., XHTML 1.0: The Extensible Hypertext Markup Language, A Reformulation ofHTML-4.0 in XML 1.0, W3C Working Draft, May 5, 1999, http://www.w3.org/TR/1999/xhtml 1-199990505/, 16 pgs.
Russian Office Action cited in Appln No. 2005116667 dated Apr. 24, 2009, 4 pgs.
U.S. Appl. No. 13/918,914, Office Action mailed Apr. 6, 2016, 22 pgs.
U.S. Appl. No. 13/918,914, Office Action mailed Jun. 8, 2015, 19 pgs.
U.S. Appl. No. 13/035,689, Office Action mailed Jul. 1, 2016, 30 pgs.
U.S. Appl. No. 14/731,023, Notice of Allowance mailed Jul. 29, 2016, 7 pgs.
European Office Action in Application 06790149.6, mailed May 17, 2016, 6 pgs.
Chinese 4th Office Action in Application 201210434821.7, mailed Jun. 22, 2016, 13 pgs.
U.S. Appl. No. 14/731,023, Amendment after Allowance filed Aug. 17, 2016, 3 pgs.
U.S. Appl. No. 14/731,023, Notice of Allowance mailed Aug. 17, 2016, 2 pgs.
Chinese 2nd Office Action in Application 201210044546.8, mailed Aug. 2, 2016, 13 pgs.
U.S. Appl. No. 13/035,689, Office Action dated Apr. 6, 2017, 39 pgs.
Webb, J., "Excel 2003 Programming: A Developer's Notebook", Chapter 6, Explore Security in Depth, copyright Aug. 20, 2004, O'Reilly Media, Inc. pp. 197-241.
U.S. Appl. No. 13/918,914, Office Action dated May 2, 2017, 24 pgs.
Chinese Notice of Allowance in Application 201210044546.8, dated Feb. 6, 2017, 4 pgs.
Chinese Notice of Allowance in Application 201210434821.7, dated Feb. 6, 2017, 4 pgs.
Japanese Notice of Allowance in Application 2014-541110, dated Apr. 3, 2017, 3 pgs.
Chinese 3rd Office Action in Application 201380007011.6, dated Apr. 1, 2017, 10 pgs.
U.S. Appl. No. 13/918,871, Office Action dated Jun. 16, 2017, 23 pgs.
U.S. Appl. No. 13/918,904, Office Action dated May 26, 2017, 32 pgs.
European Supplementary Search Report in Application 0681483.3, dated May 26, 2017, 10 pages.
Chinese 4th Office Action in Application 201380007011.6, dated Jul. 4, 2017, 10 pages.

\* cited by examiner

NATURAL INPUT FOR SPREADSHEET ACTIONS

BACKGROUND

Many people utilize spreadsheets to interact with data. Generally, users interact with spreadsheets through input devices, such as mice, touch screens, graphical user interfaces and keyboards. Sometimes this interaction can be frustrating. For example, interacting with and manipulating a large spreadsheet on a small screen device (e.g. cell phone, tablet) can be difficult and tedious.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Different gestures and actions are used to interact with spreadsheets. The gestures are used in manipulating the spreadsheet and performing other actions in the spreadsheet. For example, gestures may be used to move within the spreadsheet, select data, filter, sort, drill down/up, zoom, split rows/columns, perform undo/redo actions, and the like. Sensors that are associated with a device may also be used in interacting with spreadsheets. For example, an accelerometer may be used for moving and performing operations within the spreadsheet.

DETAILED DESCRIPTION

Figure 1:
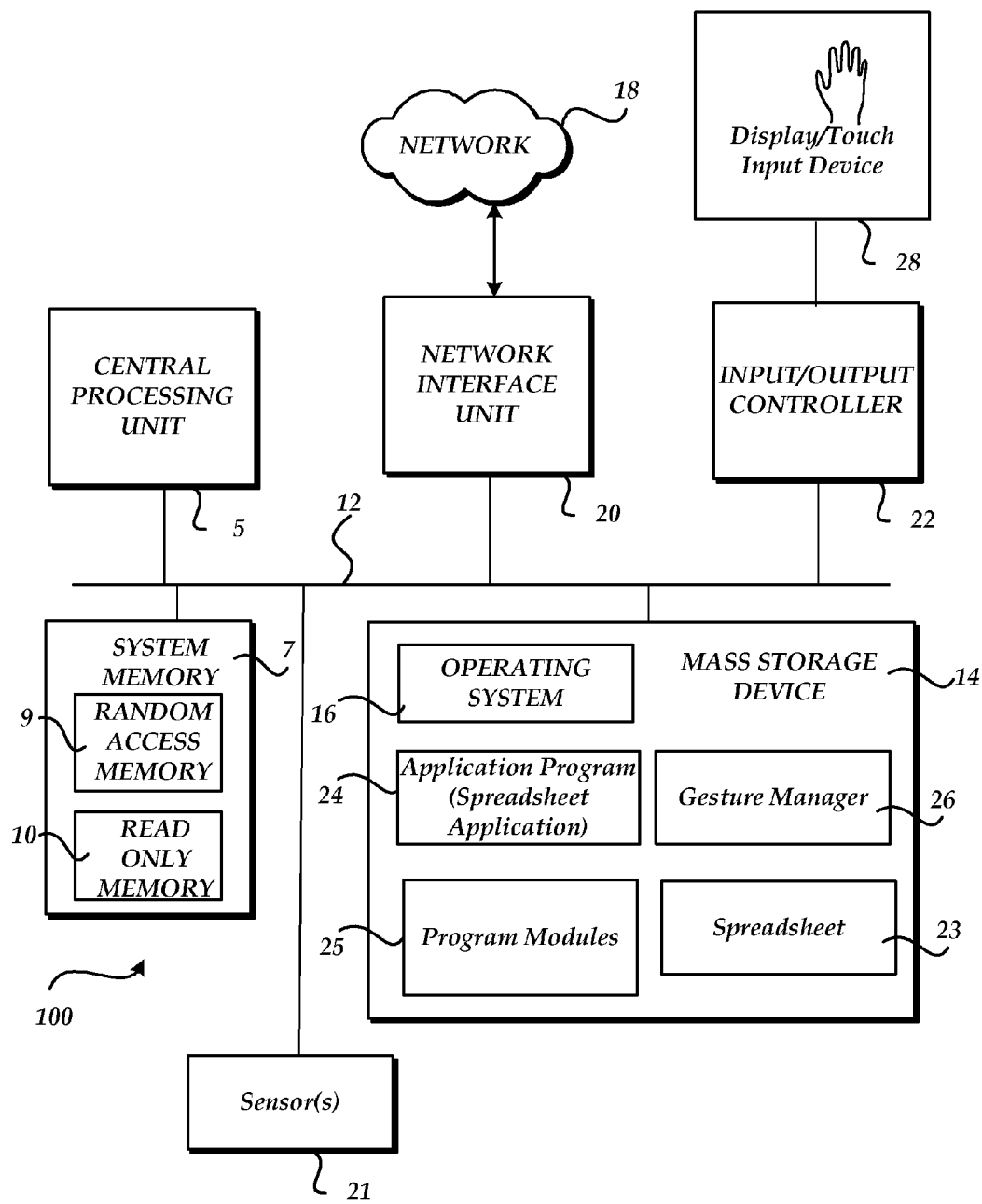
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a mobile or a desktop computer and includes a central processing unit 5 ("CPU"), a system memory 7, including a random access memory 9 ("RAM") and a read-only memory ("ROM") 10, and a system bus 12 that couples the memory to the central processing unit ("CPU") 5. According to embodiments, computer 100 is a handheld computing device such as a mobile phone, tablet, laptop, net book, PDA, and the like.

A basic input/output system containing the basic routines that help to transfer information between elements within the computer, such as during startup, is stored in the ROM 10. The computer 100 further includes a mass storage device 14 for storing an operating system 16, application program(s) 24, and other program modules 25, and gesture manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available physical media that can be accessed by the computer 100.

By way of example, and not limitation, computer-readable media may comprise computer storage media and communication media. Computer storage media includes physical volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Figure 2:
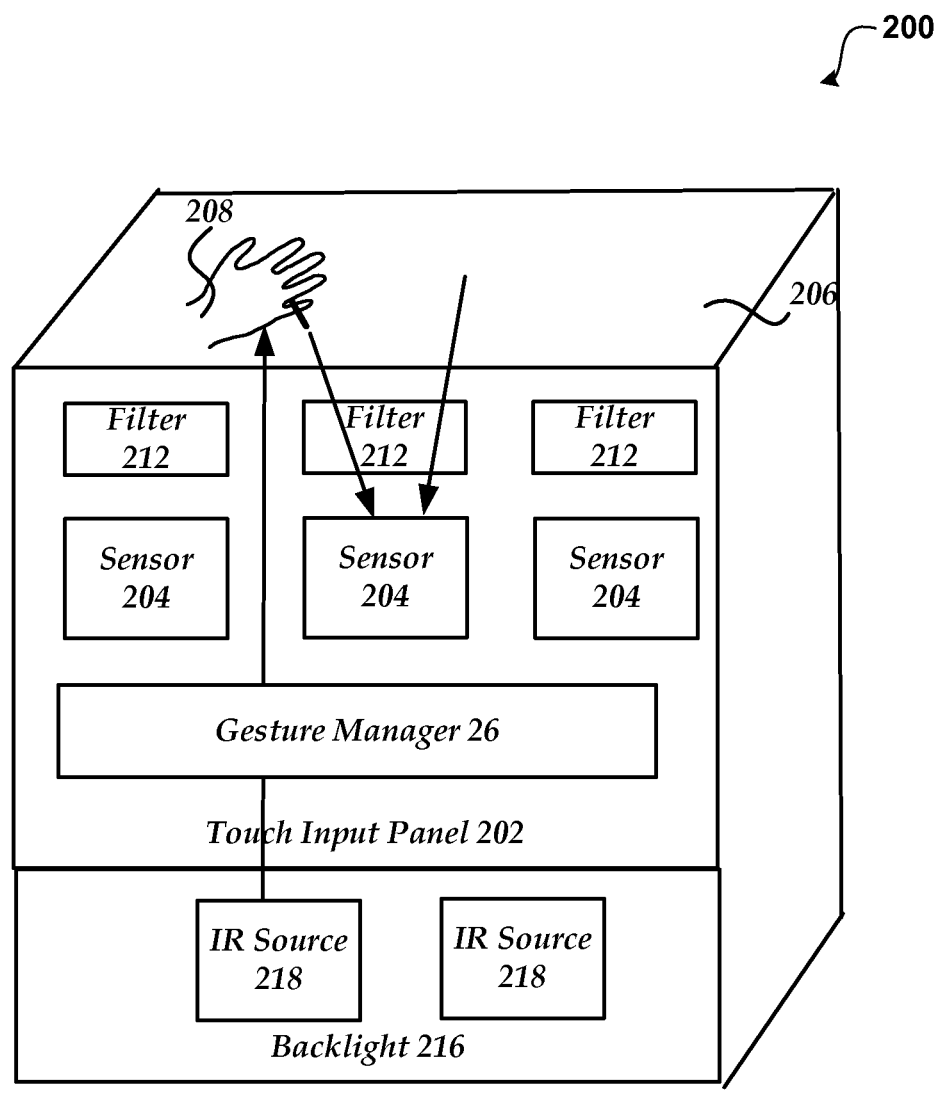
FIG. 2 illustrates an exemplary touch input system.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a display/touch input device 28. The touch input device may utilize any technology that allows touch input to be recognized at a time. For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. An exemplary touch input device is shown in FIG. 2. The touch input device 28 may also be separate from the display. The input/output controller 22 may also provide output to one or more display screens, a printer, or other type of output device.

Computer 100 may also include one or more sensors 21. According to an embodiment, computer 100 includes an accelerometer for sensing acceleration of the computer or a portion of the computer. For example, the accelerometer may detect movement of display 28. The accelerometer may be a single axis or multi-axis accelerometer that is used to sense orientation, acceleration, vibration, and other types of actions that may be sensed by an accelerometer. Other sensors may also be included, such as location sensors (i.e. GPS), audio sensors, infrared sensors, other types of tilt sensors, and the like. Information received by sensor 21 may be used to interact with an application program. For example, when a user moves the computing device, different parts of a spreadsheet may be shown in response to the movement.

As mentioned briefly above, a number of program modules and data files may be stored in the mass storage device 14 and RAM 9 of the computer 100, including an operating system 16 suitable for controlling the operation of a networked personal computer, such as the WINDOWS® 7® operating system from MICROSOFT CORPORATION of Redmond, Wash. According to one embodiment, the operating system is configured to include support for touch input device 23. According to another embodiment, a gesture manager 26 may be utilized to process some/all of the touch input that is received from touch input device 23.

The mass storage device 14 and RAM 9 may also store one or more program modules. In particular, the mass storage device 14 and the RAM 9 may store one or more application programs 24, such as a spreadsheet application. According to an embodiment, the spreadsheet application is the MICROSOFT EXCEL spreadsheet application. Other spreadsheet applications may also be used.

In conjunction with the operation of the application, gesture manager 26 is configured to detect gestures that are received by the touch input device 28. Generally, gesture manager 26 is configured to sense when a gesture is received that is related to performing an operation in conjunction with an application program, such as a spreadsheet application. Different types of gestures may be received. For example, a swipe gesture, a cut/paste gesture, an insert gesture, a vortex gesture, a grip gesture, a chart gesture, a trend line gesture, a comment gesture, a zoom gesture, a sort gesture, an undo/redo gesture, and the like may be received.

Gesture manager 26 is also configured to receive input from one or more sensors. The information received from the sensor(s) may be used alone and/or in combination with a received gesture. For example, tilting the device may cause a spreadsheet to scroll/pan in the tilted direction. Shaking the device may be used to clear a filter, reset a state, perform an undo and the like. Jerking the device may cause an acceleration in scrolling or a jump in the scroll position. Tilting the device steeply (i.e. greater then 30 degrees or some other predetermined angle) may cause the spreadsheet objects contained within spreadsheet 23 to appear as if they are spilling to the top of the spreadsheet thereby allowing the user to select one of the spreadsheet objects. Upon selection, the spreadsheet objects can return to their original location and the view may center on the chosen object. The gestures and sensor information may be used to change a display of information, activate/deactivate functions, and/or perform some other type of operation associated with application 24 or some other function and/or program. Additional details regarding the gestures and sensor information will be provided below.

FIG. 2 illustrates an exemplary touch input system. Touch input system 200 as illustrated comprises a touch panel 202 that has several sensors 204 integrated therein. According to one embodiment, the sensors 204 are Infrared (IR) sensors. The touch input system 200 is configured to detect objects that either in contact with the touchable surface 206 or are close to but not in actual contact with ("adjacent") touchable surface 206. The objects that are sensed may be many different types of objects such as finger, hands, or other physical objects. Infrared sensors 204 are distributed throughout touch panel 202 and are disposed parallel to touchable surface 206. One or more of the infrared sensors 204 may detect infrared radiation reflected from objects, such as hand 208, as indicated by the arrow. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations. Touchable surface 206 may also be changed to other orientations.

Touch panel 202 may comprise filters 212 that absorbs visible light and transmits infrared radiation and are located between touchable surface 206 and IR sensors 204 in order to shield IR sensors 204 from visible light incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. For example, the displayed image may be images relating to an application, such as a spreadsheet. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent to touchable surface 206 with infrared radiation through touchable surface 206, as indicated by the arrows. IR sensors 204 are sensitive to radiation incident from above, so IR radiation traveling directly from backlight 216 to IR sensors 204 is not detected.

The output of sensors 204 may be processed by gesture manager 26 and/or functionality included within an operating system or some other application to detect when a physical object (e.g., a hand, a bottle, a glass, a finger, a hat, etc.) has come into physical contact with a portion of the touch input surface 206 and/or a physical object is in close proximity to the surface. For example, sensors 204 can detect when a portion of hand 208, such as one or more fingers, has come in contact with or is near to the touch input display surface 206. Additional sensors can be embedded in the touch input display surface 206 and can include for example, accelerometers, pressure sensors, temperature sensors, image scanners, barcode scanners, etc., to detect multiple simultaneous inputs.

When the sensors 204 are IR sensors, the IR radiation reflected from the objects may be reflected from a user's hands, fingers, reflective ink patterns on the objects, metal designs on the objects or any other suitable reflector. Fingers reflect enough of the near IR to detect that a finger or hand is located at a particular location on or adjacent the touchable surface. A higher resolution of IR sensors may be used to scan objects in order to achieve higher resolution.

Sensors 204 can be included (e.g., embedded) in a plurality of locations. The density of sensors 204 can be sufficient such that contact across the entirety of touch input surface 206 can be detected. Sensors 204 are configured to sample the surface of touch input display surface 206 at specified intervals, such as, for example, 1 ms, 5 ms, etc. for detected contact and/or near contact. The sensor data received from sensors 204 changes between sampling intervals as detected objects move on the touch surface; detected objects are no longer within range of detection; and when new objects come in range of detection. For example, gesture manager 26 can determine that contact was first detected at a first location and then contact was subsequently moved to other locations. In response, the gesture manager 26 may determine when a gesture is received and what type of gesture is received.

FIG. 2 provides just one example of a touch input system. In other exemplary touch systems, the backlight may not comprise any IR sources and the surface 206 may include a frontlight which comprises at least one IR source. In such an example, the touchable surface 206 of the system is a surface of the frontlight. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch input system 200 may comprise an OLED display which comprises IR OLED emitters and IR-sensitive organic photosensors (which may comprise reverse-biased OLEDs). In some touch systems, a display may not be included. Even if the touch system comprises one or more components or elements of a display, the touch system may be configured to not display images. For example, this may be the case when the touch input tablet is separate from a display. Other examples include a touchpad, a gesture pad, and similar non-display devices and components.

For some applications, it may be desirable to detect an object only if it is in actual contact with the touchable surface of the touch panel system. For example, according to one embodiment, a gesture may not be recognized when the gesture is not performed touching the surface. Similarly, a gesture may be recognized when performed above the surface. The IR source of the touch input system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Figure 3:
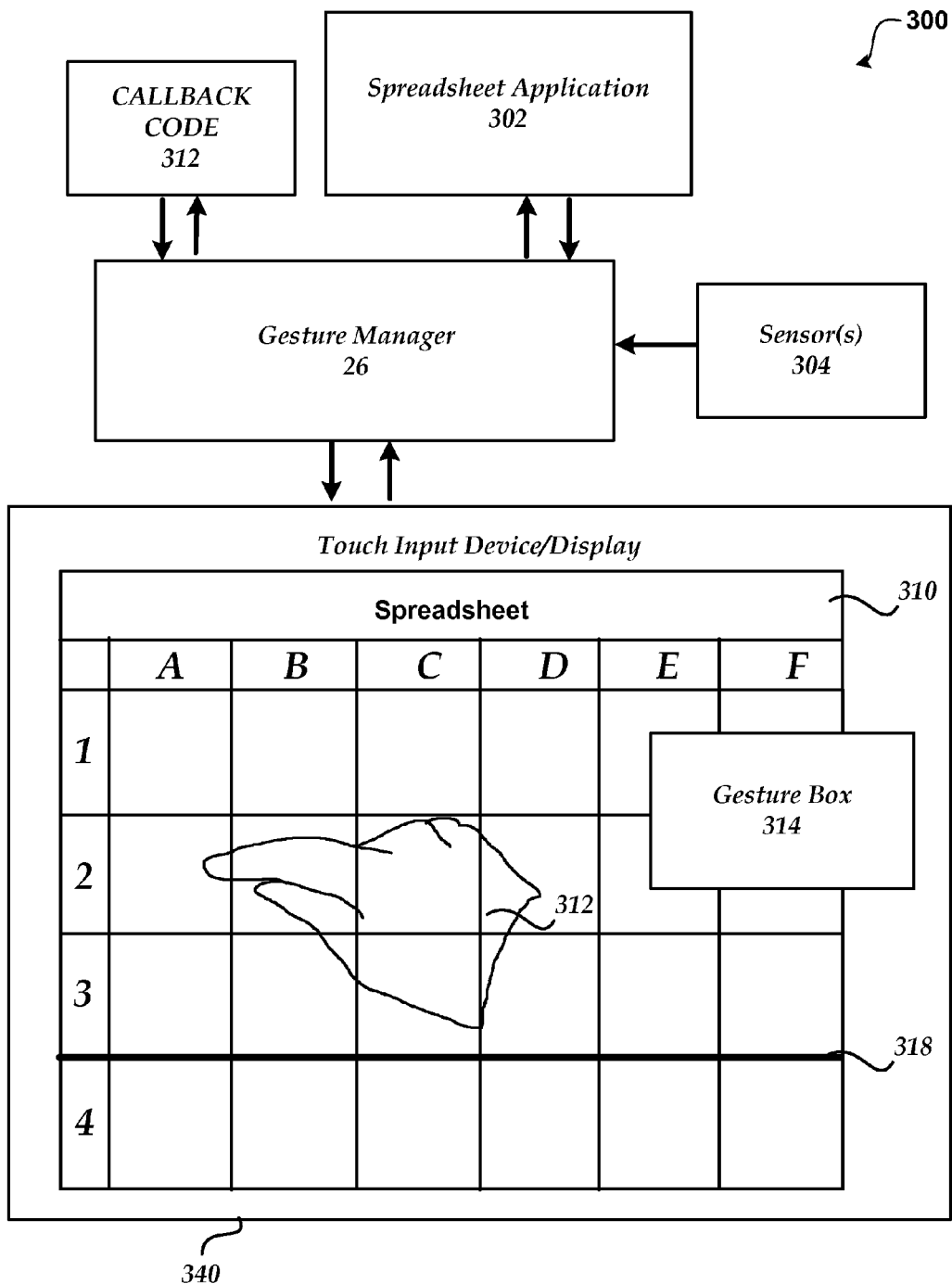
FIG. 3 shows a system for using gestures and sensor information to interact with an application.

FIG. 3 shows a system for using gestures and sensor information to interact with an application. As illustrated, system 300 includes spreadsheet application 302, callback code 312, sensor(s) 304, gesture manager 26, spreadsheet 310 and touch input device/display 340. According to an embodiment, the functionality of system 300 is included within a mobile computing device.

In order to facilitate communication with the gesture manager 26, one or more callback routines, illustrated in FIG. 3 as callback code 312 may be implemented. According to one embodiment, gesture manager 26 is configured to receive input from a touch-sensitive input device 340 and sensor(s) 304. For example, gesture manager 26 may provide an indication to application 302 when a user's hand (i.e. hand 312) or some other object performs a gesture that is used in interacting with spreadsheet 310. Sensor information may also be received by gesture manager 26 to interact with spreadsheet 310. For example, a user may tilt or tap the side of the computing device to scroll the display of spreadsheet 310.

Gesture manager 26 is configured to recognize many different types of gestures. Some of the gestures may be context dependent, be specific to an application and/or be used within many different types of applications. For example, gestures may be used to interact with a spreadsheet 310 that is associated with a spreadsheet application 302. Gestures may be received in many different locations relating to touch input device/display 340. For example, a gesture may be received within a display of spreadsheet 310, within a gesture box 314 and/or at some other location on display 340.

Gestures may be predetermined and/or specified in different ways. For example, some gestures may be predetermined to be associated with a particular action whereas other gestures may be associated with one or more actions by a user. For instance, a user could specify that when a particular gesture is received then one or more spreadsheet operations are to occur. The operation may be specified in many different ways. For example, programming code may be used, a macro may be created, a formula may be configured, and the like.

There are many different examples of actions that may occur. For example, certain gestures when recognized may reverse the polarity of conditional formatting (i.e. change from high-to-low to low-to-high formatting). Performing a gesture may change formatting of the data (i.e high values were originally formatted to be green and now are red after the user performs a certain gesture). One or more gestures may result in reversing the orientation of charts. For example, a chart was originally displaying data from January to March and after a gesture is performed, the chart reverses and display data from March to January. One or more gestures may expose more information. For example, suppose that a chart currently is displaying data between January 2009 to March 2009. When a gesture is received, the display of the chart shifts and shows data from February 2009 to June 2009. Exemplary gestures and interactions with a spreadsheet are described below with reference to FIGS. 4-12.

Sensor information received by gesture manager 26 may be used to interact with spreadsheet 310. For example, the relative position of the computing device/display may be used to determine the portion of the spreadsheet to display. For example, moving the device to the left may scroll/pan the display of spreadsheet to the left whereas moving the device to the right may scroll/pan the display of the spreadsheet to the right. The scrolling/panning of the display may be a combination of a horizontal and vertical scrolling/panning. For example, moving the device diagonally may result in an equal amount of horizontal and vertical scroll/pan. The terms "scroll" and "pan" as used herein may be used interchangeably. Moving the device upwards or downwards may also affect the display of spreadsheet 310. For example, moving the device down may perform a zoom out operation such that more of the spreadsheet is displayed whereas moving the device in an upwards direction may be a zoom in operation such that a more detailed view of the spreadsheet is displayed. According to an embodiment, a zoom out operation displays a thumbnail view for each sheet of the spreadsheet workbook when the zoom exceeds a predetermined zoom level. Moving the spreadsheet upwards/downwards may also cause drilling operations to be performed on the spreadsheet. For example, moving the device in an upwards direction may perform a drilling up operation to less detail in the spreadsheet whereas moving the device in a downwards may perform a drilling down operation to show more detail.

The speed of the movement of the spreadsheet/computing device may also be used in determining a speed of the scrolling and/or zooming. For example, a sudden movement in a direction may increase the speed of the scrolling and/or zooming action. According to an embodiment, scrolling may slow/stop when it comes near a predetermined location ("speed bump") within the spreadsheet. The location of the speed bumps may be placed at different locations within the spreadsheet. They may be automatically determined and/or manually located. A speed bump may be automatically placed whenever there is a gap in the data within the spreadsheet. For example, suppose that a spreadsheet has content from rows 1-3 and 10-20 and no content from rows 4-10. A speed bump may be placed at row 4 (318). When the user pans to row 4, the panning stops as if it hit the end of the spreadsheet. The panning may also slow as it nears the end of the data before the speed bump. To continue panning, the user just performs the panning operation again. Speed bumps may also be placed periodically throughout the grid of the spreadsheet (i.e. every 100 rows, 200 rows, 1000 rows, and the like). Different actions may also be associated with the speed bumps. For example, the movement of the spreadsheet may stop when it hits a speed bump, slow when it hits a speed bump and then speed up as it moves away from the speed bump, and the like.

The orientation of the spreadsheet/computing device may also be monitored. Tilting the display of the spreadsheet causes the display of the spreadsheet to scroll/pan in the tilted direction. An amount of tilt and/or a speed of the tilt may also be used to perform operations. For example, tilting the device steeply in the vertical direction may cause all the spreadsheet objects within spreadsheet 310 to appear as if they are spilling to the top of the spreadsheet (See FIG. 12). The titling may also be interpreted to navigate different data within an object. For example, tilting the device may navigate across the data series in a chart.

Rotating the device may be used to change views that are associated with the spreadsheet. For example, rotating the display of the spreadsheet may cause the view to change from a sheets view to a Named Object View that displays each object that is associated with spreadsheet 310. Similarly, when a user is viewing an object, the view may be changed based on the object. For example, when a user is viewing a pie chart, rotating the spreadsheet may cause the view to change to some other type of chart (e.g. bar chart).

Shaking the device may also be determined to perform operations relating to the spreadsheet. For example, shaking the device may be used to clear filters that are set on a table or pivot table within a spreadsheet, reset a state, perform and undo operation, and the like.

FIGS. 4-12 illustrate exemplary gestures and actions to interact with a spreadsheet.

Figure 4:
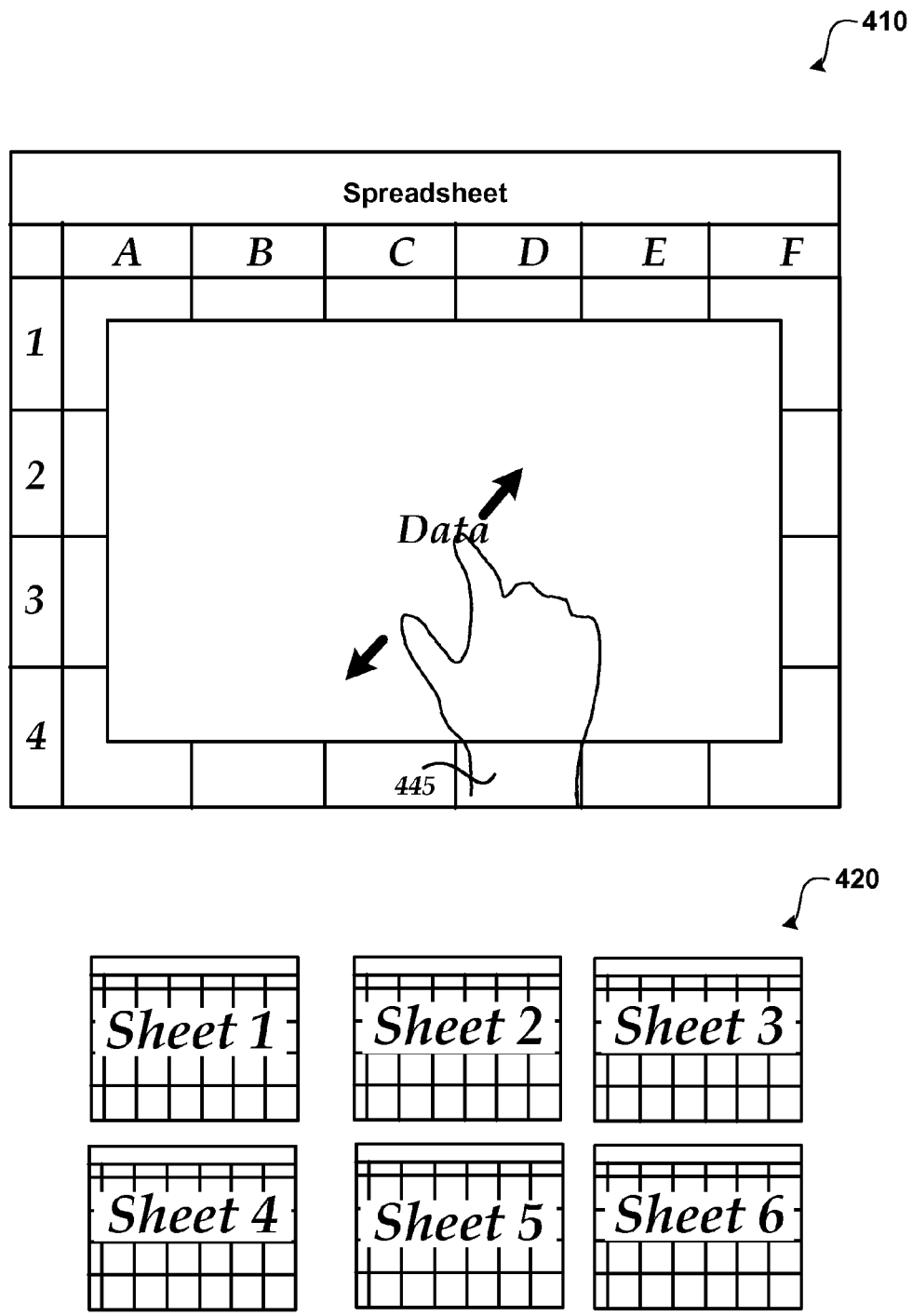
FIG. 4 shows a zooming gesture within a spreadsheet.

FIG. 4 shows a zooming gesture within a spreadsheet. As illustrated, FIG. 4 shows a spreadsheet view 410 before zooming and a zoomed view 420 after performing a zoom out operation. According to an embodiment, a zoom gesture is detected when a user spreads two of their fingers apart as indicated by gesture 445. A zoom in gesture may be detected when a user closes two of their fingers. The zoomed out view 420 may be shown when a user zooms out beyond a certain point (i.e. <5%) and/or based on a speed of the movement between the two fingers of the gesture. For example, a very quick separation of the fingers may cause the thumbnail zoomed view 420 to be shown. As illustrated, zoomed view 420 is a thumbnail view of each sheet within the spreadsheet workbook. Other zoomed views may also be provided. For example, before zooming to the thumbnail view of each sheet within the spreadsheet, a Named Object View of the current may be displayed at a predetermined zoom level (e.g. at a zoom level 15-20%).

Figure 5:
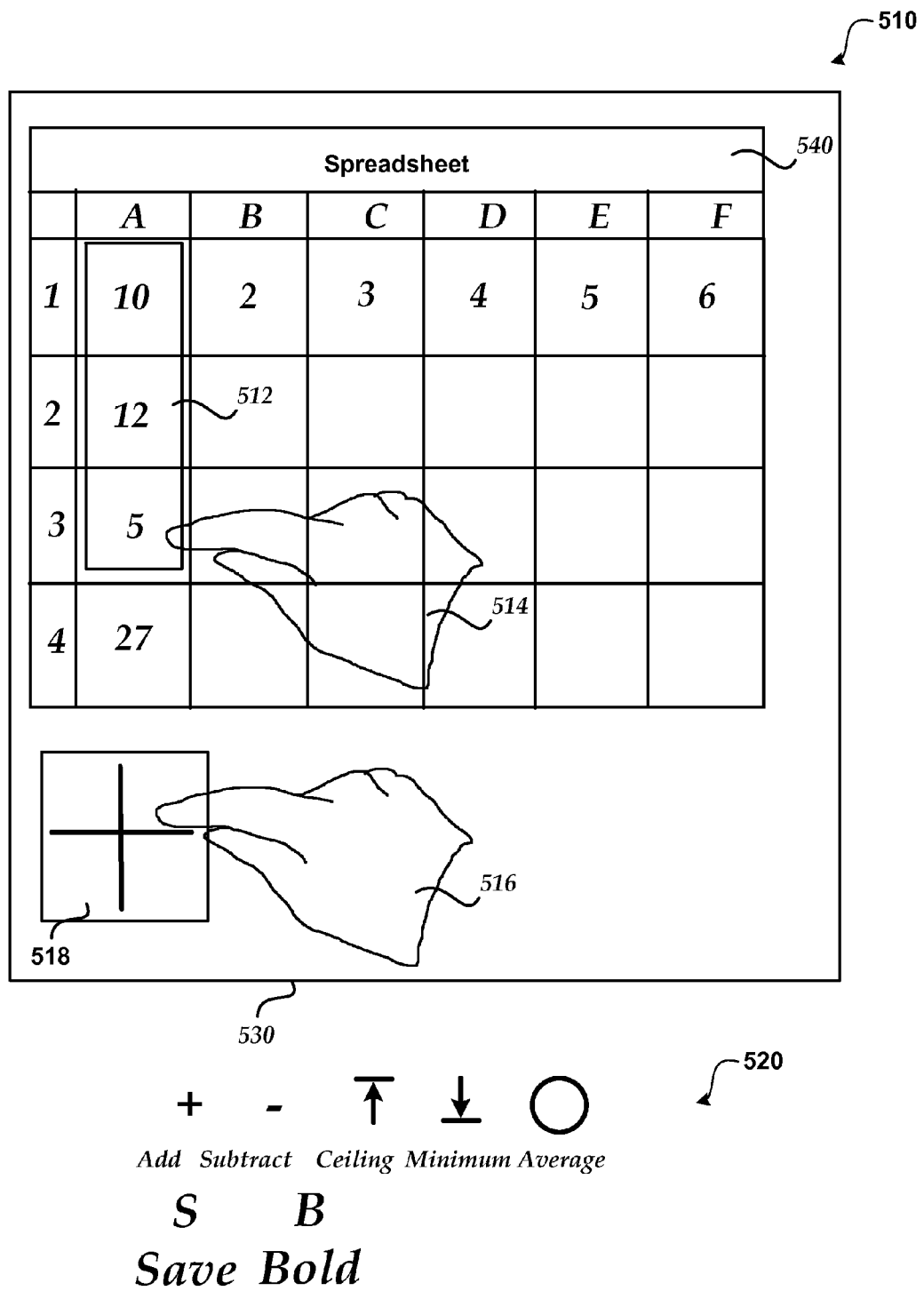
FIG. 5 illustrates the use of a gesture box.

FIG. 5 illustrates the use of a gesture box. As illustrated, FIG. 5 illustrates display 530 that shows spreadsheet 540, selection 512, and gesture box 518. According to an embodiment, the gesture box 518 is drawn near a corner of the display. A gesture 516 may be drawn into the gesture box 518. Each gesture is associated with a particular command. For example, some exemplary commands are illustrated by gesture box commands 520. For example: drawing S could save the spreadsheet, drawing B could bold text, drawing a + sign could write a sum formula drawing a − sign could write a subtraction formula, drawing an up arrow could sort upwards, drawing a down arrow could sort downwards, drawing a circle could write an average formula. Other gesture commands may be used within gesture box 518. For example, a user could create custom gestures and/or modify existing gestures. These gestures could be recorded and associated with programming code, commands, and/or macros.

As illustrated, a user has created a selection 512 of the numbers 10, 12 and 5 with gesture 514 and then draws a "+" symbol within gesture box 518. In response to drawing the + symbol, a sum formula is written to grid location A4 that causes the value 27 to be displayed. A user may draw any gesture command into the box that was appropriate for selection 512. For example, a user may draw a circle within gesture box 518 that writes an average formula that would base 9 to be displayed at location A4.

While gesture box 518 is shown at the bottom left location of display 530, the gesture box may be displayed at other locations. For example, gesture box 518 may be displayed on top of spreadsheet 540, or at any other location on display 530.

Figure 6:
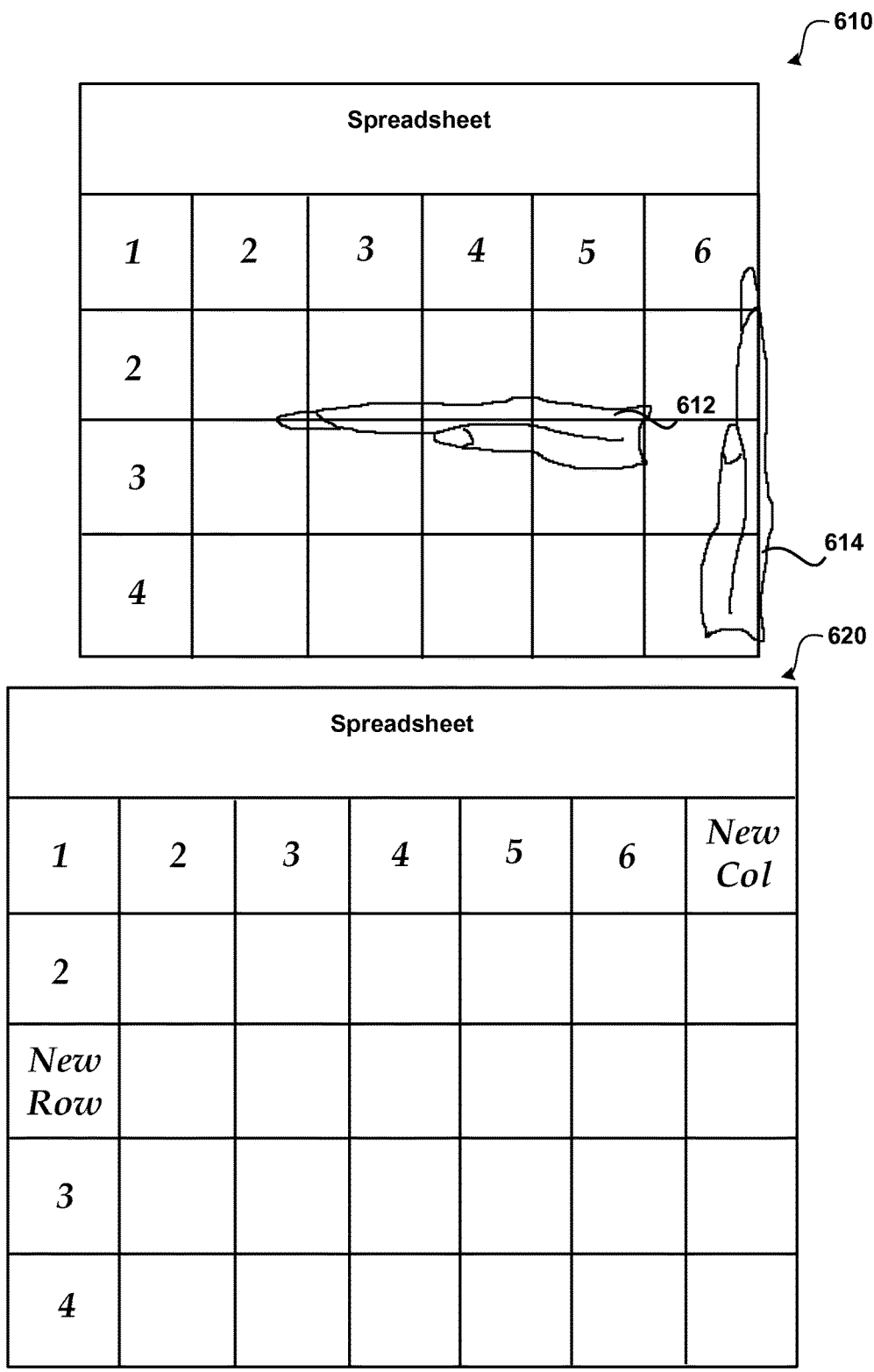
FIG. 6 shows a karate chop gesture.

FIG. 6 shows a karate chop gesture. As illustrated, FIG. 6 shows spreadsheet 610 receiving a horizontal karate type gesture 612 and a vertical karate type gesture 614. The karate type gesture is used to insert a row/column at a particular location within a spreadsheet. The karate chop gesture is detected when a karate chop motion is performed. For example, the edge of a user's hand may be detected or an edge of another physical object with an edge having similar characteristics to a user's hand may be detected to receive the karate type gesture. When a horizontal karate chop gesture 612 is received a new row is inserted at the location of the karate chop gesture. When a vertical karate chop gesture 614 is received a new column is inserted at the location of the karate chop gesture. In the current example, a new row is inserted between rows 2 and 3 and a new column is inserted after column 6 (see spreadsheet 620). According to another embodiment, the karate chop gesture is associated with other commands. For example, the karate chop gesture could trigger the automatic conversion of text-to-columns.

Figure 7:
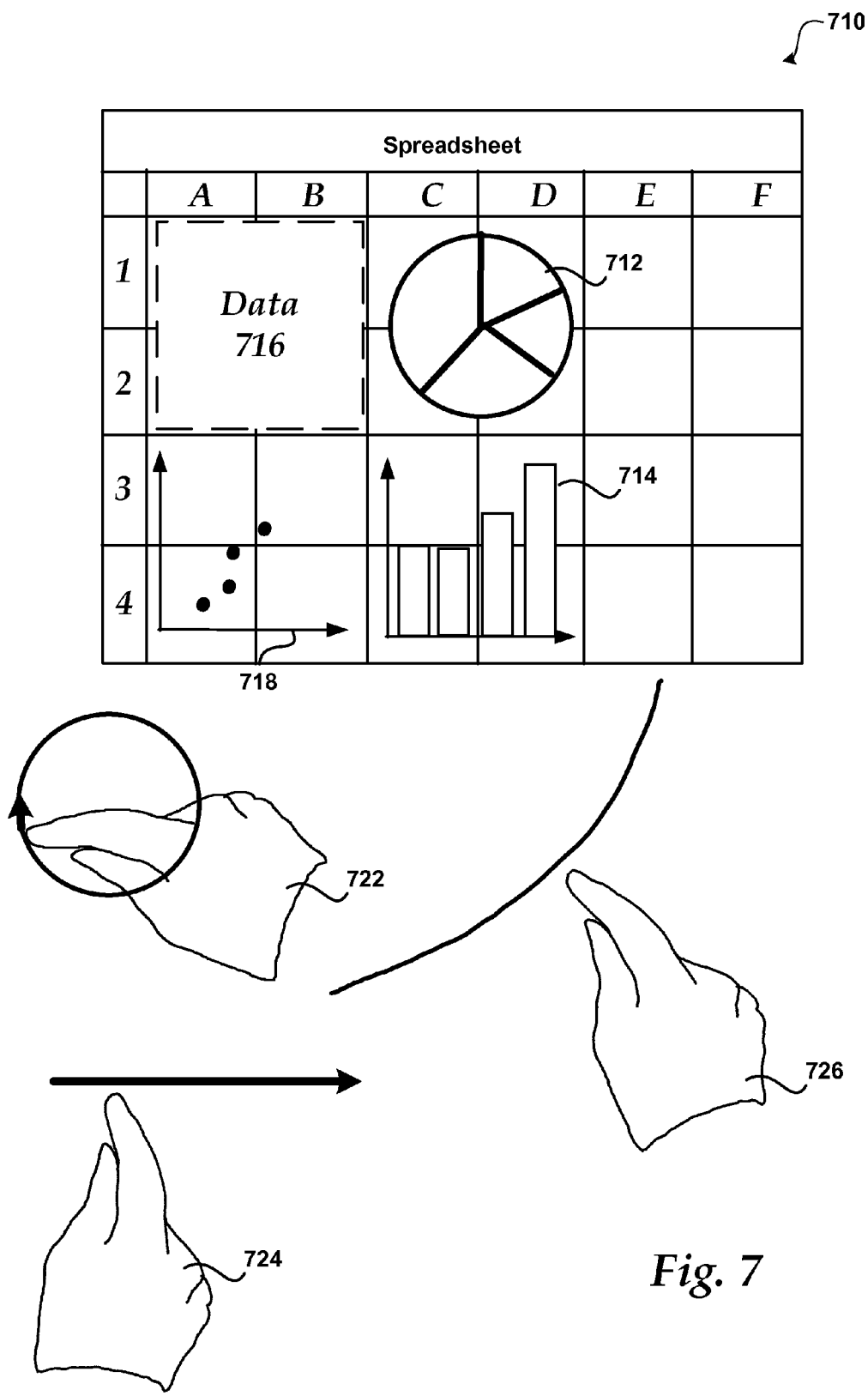
FIG. 7 shows a user selecting data and then drawing a chart gesture to change a view of the selected data.

FIG. 7 shows a user selecting data and then drawing a chart gesture to change a view of the selected data. As illustrated, FIG. 7 shows a spreadsheet 710 comprising data 716. In the current example, a user has selected data 716 and then draws a chart gesture to create a display of a chart to represent the selected data.

Chart gesture 722 shows the user drawing a circle that represents a pie chart. When the user has completed chart gesture 722, a pie chart 712 is displayed. The chart may be displayed at different locations. For example, the chart may replace the selected data, the chart may be placed near the selected data or the chart may be placed at a user designated position. The chart may also be placed on another sheet of the spreadsheet workbook.

Chart gesture 724 shows a user drawing a chart gesture that is in the form of a line that creates a bar chart 714 for selected data 716. According to an embodiment, more than one type of chart may be displayed with selected data.

Chart gesture 726 shows a user drawing a chart gesture that is in the form of a semi-circle line that creates a scatter chart 718 for selected data 716. According to an embodiment, more than one type of chart may be displayed with selected data.

Figure 8:
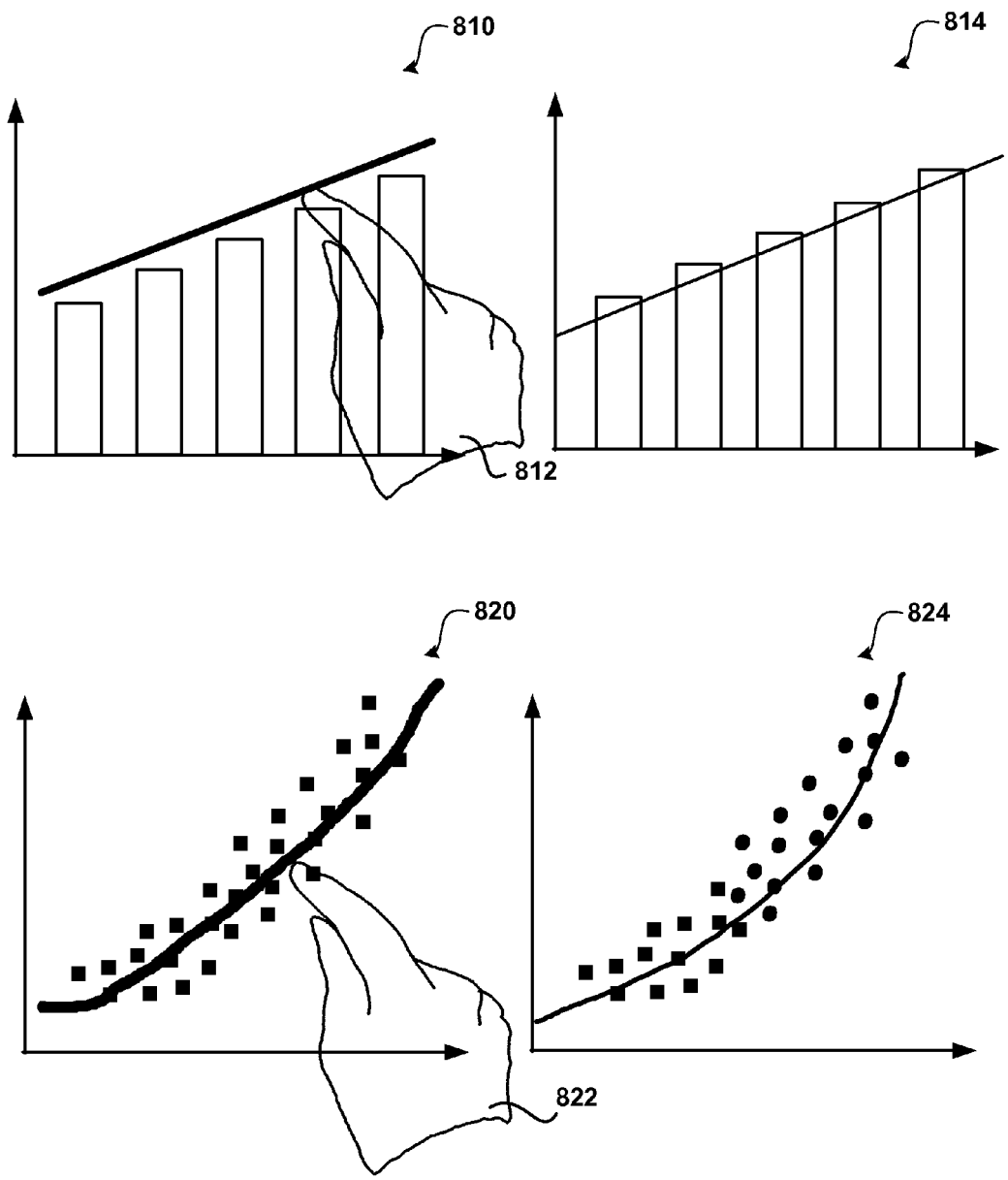
FIG. 8 shows a user drawing a trend line gesture on a chart.

FIG. 8 shows a user drawing a chart gesture that is recognized as a trend line gesture on a chart. As illustrated, FIG. 8 shows a bar chart 810 bar chart 814 with a trend line, scatter chart 820 and scatter chart 824 with a logarithmic trend line. In the example of the bar chart, a user draws a trend line gesture 812 that is near the edges of the displayed chart elements data to create a display of a trend line with the bar chart (814). In the example of the scatter chart 820, a user draws a trend line gesture 822 that is a line near the middle of the data to create a display of a trend line with the scatter data 824.

Figure 9:
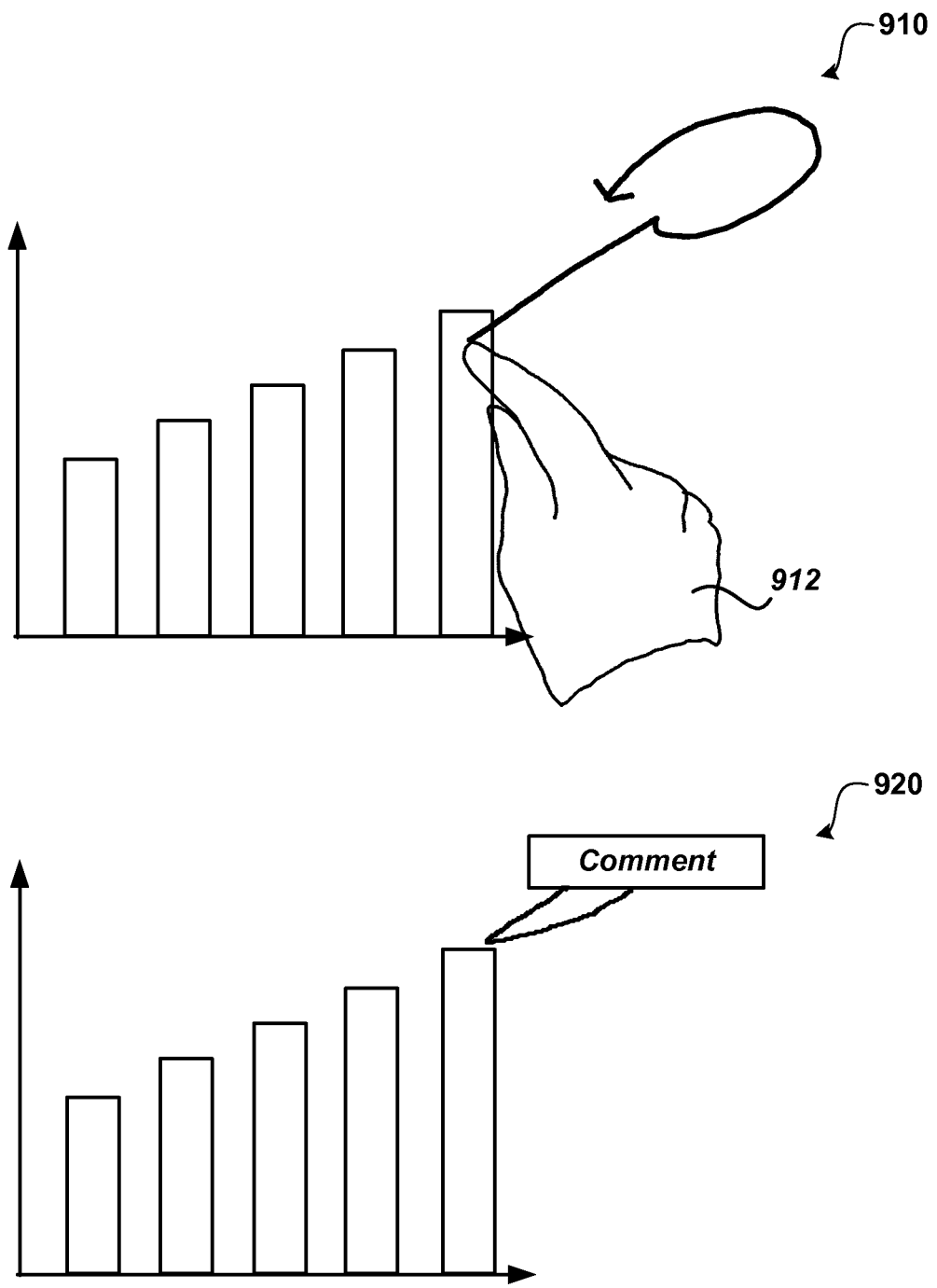
FIG. 9 illustrates a comment gesture.

FIG. 9 illustrates a comment gesture. A comment gesture creates a comment location near the beginning of the comment gesture. For example, in FIG. 9, a comment is located near the top of the last bar chart (920). The comment gesture is a line followed by a portion of a circle as illustrated by display 910. While the comment gesture is shown being performed on a chart, the comment gesture may be located anywhere within a display and be associated with different types of elements. For example, a comment gesture may be associated with a single cell, a group of selected cells, a chart, a table, or some other object. A comment box is displayed in response to receiving the comment gesture that allows a user to enter a comment.

Figure 10:
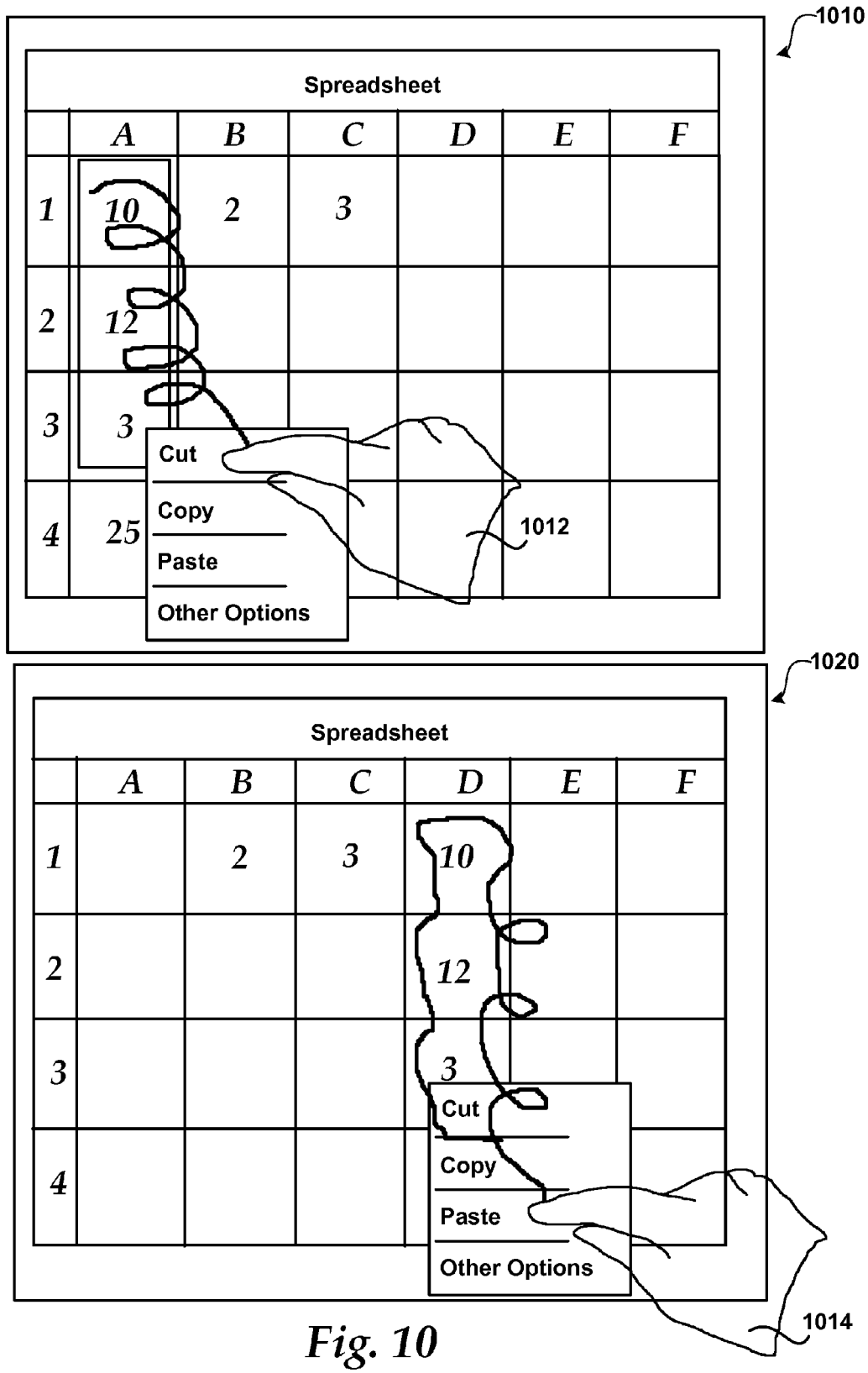
FIG. 10 shows a vortex effect in response to an action being performed on data.

FIG. 10 shows a vortex effect in response to an action being performed on data. As illustrated, display 1010 shows a user cutting selected data. In response to the cut option being selected, an animation that looks like a "vortex" is displayed creating the illusion that the content that is cut is getting sucked into the finger (1012). According to an embodiment, content disappears to the point where the finger last contacted the screen.

Display 1020 shows a user pasting data. On a paste command, the content is drawn outward from the finger point of contact (1014) and the vortex animation creates the illusion that the pasted content is coming out of the finger.

Figure 11:
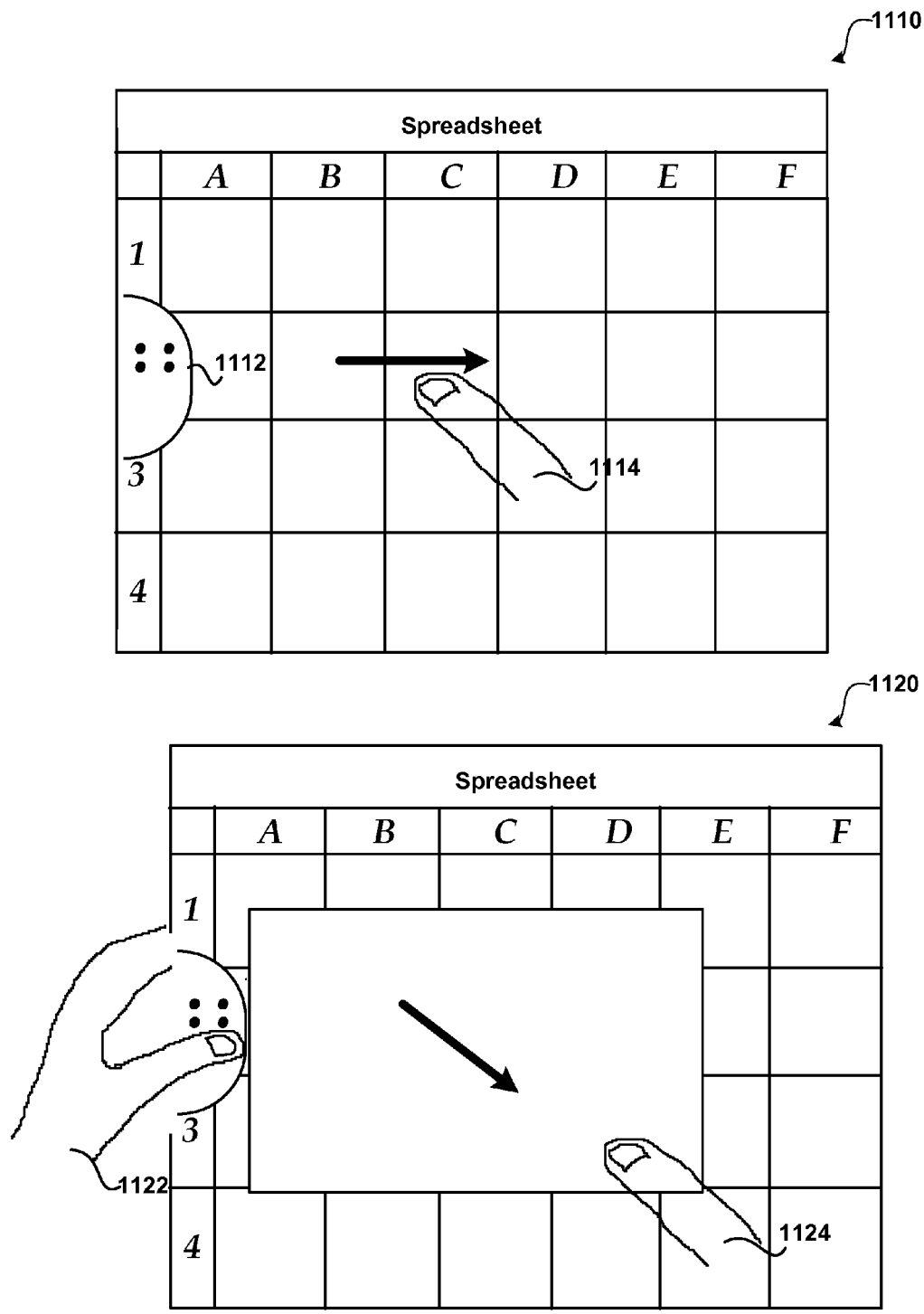
FIG. 11 illustrates a display and interaction with a grip user interface element.

FIG. 11 illustrates a display and interaction with a grip user interface element. A grip user interface element 1112 is displayed on top of a document, such as a spreadsheet 1110. According to an embodiment, the grip user interface element 1112 is placed on the side of the screen of the non-dominant hand (e.g. for right handed users on the left side and for left handed users on the right side). When the grip 1112 is not held down, a slide action by the dominant hand 1114 is interpreted as a pan.

When the grip is held down (e.g. by the non-dominant hand) as illustrated in display 1120, any slide action by the other hand 1124 is interpreted as selecting cells. Different effects may be applied with the display of grip 1112. For example, the grid of the spreadsheet can visually "bend" at the point of contact with the grip to provide visual feedback that the grip is being held down.

Figure 12:
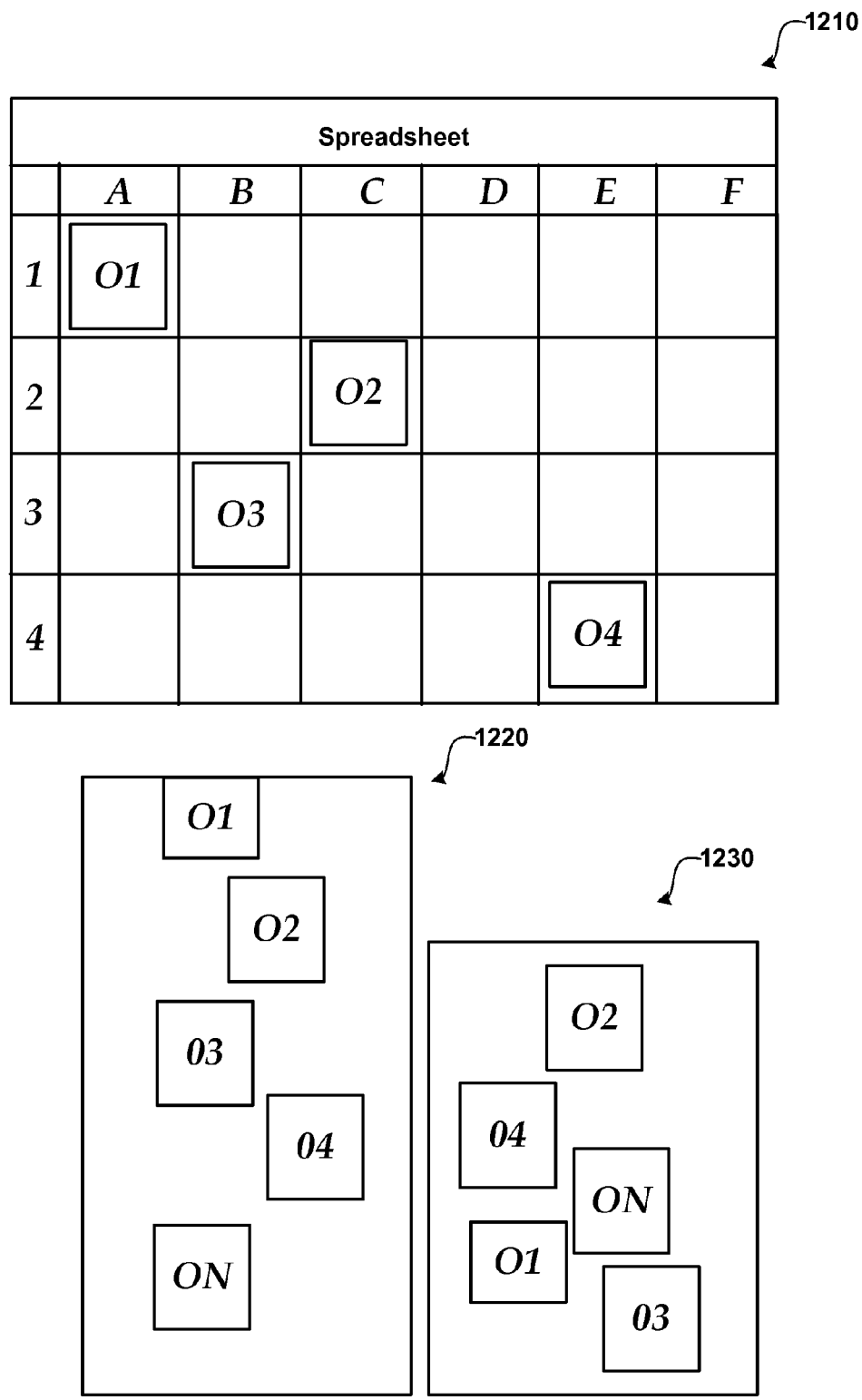
FIG. 12 shows spreadsheet objects being displayed based on a movement of the device.

FIG. 12 shows spreadsheet objects being displayed based on a movement of the device.

Display 1220 shows spreadsheet objects spilling off of the display. For example, tilting the computing device in the vertical direction may cause the spreadsheet objects within spreadsheet 1210 to appear as if they are spilling to the top of the spreadsheet as shown in display 1220. Tilting the device horizontally may cause the spreadsheet objects to spill to the side of the device. Upon selection of an object, the spreadsheet is displayed with the view centered on the chosen object. This provides a faster way to navigate objects on a sheet.

Display 1230 shows spreadsheet objects being gravity sorted. For example, the user may tilt the computing device from landscape to portrait mode, and then shake the device. According to an embodiment, the combined actions sort the data so the largest items appear on the bottom. The data may be numbers, chart data, spreadsheet objects and the like. For example, when applied to a bar chart, it would appear that the heaviest bars of the chart are falling to the bottom.

Figure 13:
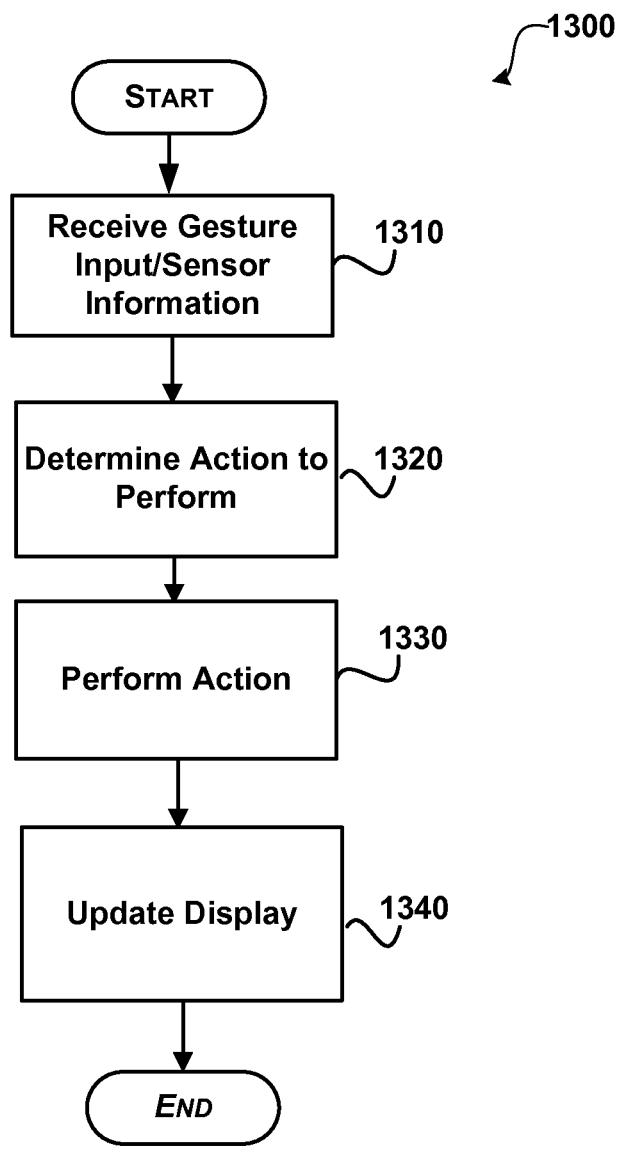
FIG. 13 shows an illustrative process for using gestures and sensors to interact with a spreadsheet.

Referring now to FIG. 13, an illustrative process 1300 for using gestures and sensors to interact with a spreadsheet will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 1310, where a gesture is received and/or sensor information is received. The gesture may be any of the gestures described herein or other recognized gestures, such as a karate chop gesture, a grip gesture, a shape gesture, a trend line gesture, a comment gesture, a zoom gesture, a sort gesture, and the like may be received. According to one embodiment, the user places at least a portion of their hand (e.g. one or more fingers) on the touch surface. Additionally, according to some embodiments, the user may place their hand near the surface of the touch surface but not on the touch surface. The sensor information may relate to many different types of sensor information that may be used in interacting with a display. For example, the sensor information may relate to accelerometer data that may be used in determining an orientation of the computing device and a speed of the device, Moving to operation 1320, the action to perform is determined. According to an embodiment, the action relates to interacting with a spreadsheet and comprises actions such as panning, tilting, sorting, zooming, drilling, and the like. While the actions described relate to interaction with spreadsheets, other applications may be utilized with the gestures described.

Flowing to operation 1330, the determined action is performed. Generally, the action relates to updating a spreadsheet. For example, a chart may be created, a trendline may be added, data may be sorted, summed, or some other operation may be performed on data, and the like.

Transitioning to operation 1440, the display is updated. The display is updated in response to the action received gesture/sensor information that is received.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interacting with a spreadsheet, comprising:
   receiving a gesture on a touch input device, wherein the received gesture is used to interact with the spreadsheet;
   receiving sensor information, wherein the sensor information is used to interact with the spreadsheet, wherein the sensor information comprises accelerometer data that is used in changing a view of the spreadsheet, wherein the accelerometer data is used to perform one of:
      a zoom out operation with respect to the spreadsheet in response to moving the touch input device in a first direction, and
      a zoom in operation with respect to the spreadsheet in response to moving the touch input device in a second direction, and
      wherein the zoom out operation and the zoom in operation slow at one or more predetermined locations within the spreadsheet, wherein the one or more predetermined locations are prepositioned within the spreadsheet based at least in part on an arrangement of data within the spreadsheet;
   automatically determining a type of the received gesture with respect to the spreadsheet;
   performing an action in response to at least one of the determined type of the received gesture with respect to the spreadsheet and the sensor information, wherein performing the action in response to the determined type of the received gesture comprises one or more of:
      performing a first action in response to the spreadsheet receiving a karate chop gesture, performing a second action in response to the spreadsheet receiving a chart gesture, performing a third action in response to the spreadsheet receiving a comment gesture, performing a fourth action in response to the spreadsheet receiving a grip gesture, performing a fifth action in response to the spreadsheet receiving a gesture within a gesture box, and performing a sixth action in response to the spreadsheet receiving a sort gesture; and
   updating a display of the spreadsheet.

2. The method of claim 1, further comprising:
   in response to receiving the karate chop gesture on the spreadsheet, inserting at least one of a row and a column in the spreadsheet near a location of the karate chop gesture.

3. The method of claim 1, further comprising:
   in response to receiving the chart gesture, inserting at least one of: a trend line on a displayed chart in the spreadsheet and a chart in the spreadsheet.

4. The method of claim 1, further comprising:
   in response to receiving the comment gesture, displaying a comment box to receive a comment at a location near a received gesture location.

5. The method of claim 1, further comprising:
   displaying a grip user interface element on the display of the spreadsheet;
   in response to receiving the grip gesture when the grip user interface element is pressed, selecting a portion of the spreadsheet in response to a finger being moved across the spreadsheet; and
   in response to receiving the grip gesture when the grip user interface element is not pressed then changing the display of the spreadsheet.

6. The method of claim 1, further comprising:
   in response to receiving a zoom gesture, performing at least one of:
      displaying a thumbnail for each sheet within a workbook that is associated with the spreadsheet when a zoom level exceeds a predetermined threshold; and
      displaying a drilled down view of the data of the spreadsheet.

7. The method of claim 1, further comprising:
   displaying a gesture box for receiving gesture commands;
   when a gesture is received within the gesture box, a gesture command from the gesture; and
   performing the gesture command on data in the spreadsheet.

8. The method of claim 1, further comprising:
   displaying a vortex animation in response to a cut command and in response to a paste command based on a location of the received gesture.

9. The method of claim 1, wherein automatically determining the type of the received gesture comprises determining when the gesture is the sort gesture, and wherein performing the action comprises sorting at least a portion of the data within the spreadsheet.

10. The method of claim 1, further comprising:
    determining when the spreadsheet is tilted;
    determining a speed of the tilting; and
    wherein performing an action comprises at least one of:
       scrolling a display of the spreadsheet based on at least one of the tilt and the speed of the tilting; and
       displaying spreadsheet objects in the spreadsheet spilling to a top of the spreadsheet.

11. The method of claim 1, further comprising:
    automatically slowing the scrolling of the spreadsheet when a speed bump that is associated with a position in the spreadsheet is within a predetermined position.

12. The method of claim 1, further comprising:
    determining when the spreadsheet is shaken and performing at least one of:
       clearing a filter on a spreadsheet object; and
       performing a gravity sort that sorts spreadsheet data based on a weight of the spreadsheet objects.

13. The method of claim 1, further comprising:
 determining when the spreadsheet is rotated; and
 in response, changing a type of view of the spreadsheet.

14. A computer-readable storage medium storing computer-executable instructions for interacting with a spreadsheet comprising:
 determining when a gesture on a touch input device is received, wherein the received gesture is used to interact with the spreadsheet;
 using accelerometer data as part of changing a view of the spreadsheet including using the accelerometer data to perform one of:
  a zoom out operation with respect to the spreadsheet in response to moving the touch input device in a first direction, and
  a zoom in operation with respect to the spreadsheet in response to moving the touch input device in a second direction,
  wherein the zoom out operation and the zoom in operation slow at one or more predetermined locations within the spreadsheet, wherein the one or more predetermined locations are prepositioned within the spreadsheet based at least in part on an arrangement of data within the spreadsheet;
 automatically determining a type of the received gesture with respect to the spreadsheet;
 performing an action in response to the determined type of the received gesture with respect to the spreadsheet, wherein performing the action in response to the determined type of the received gesture comprises one or more of: performing a first action in response to the spreadsheet receiving a karate chop gesture, performing a second action in response to the spreadsheet receiving a chart gesture, performing a third action in response to the spreadsheet receiving a comment gesture, performing a fourth action in response to the spreadsheet receiving a grip gesture, performing a fifth action in response to the spreadsheet receiving a gesture in a gesture box, and performing a sixth action in response to the spreadsheet receiving a sort gesture; and
 updating a display of the spreadsheet.

15. The computer-readable storage medium of claim 14, further comprising:
 using the accelerometer data to reset a state of the spreadsheet.

16. The computer-readable storage medium of claim 15, further comprising:
 determining when the spreadsheet is tilted; and
 wherein performing the action comprises displaying spreadsheet objects in the spreadsheet spilling to a top of the spreadsheet.

17. The computer-readable storage medium of claim 15, further comprising:
 in response to a movement of the spreadsheet, scrolling the spreadsheet; and
 automatically slowing the scrolling of the spreadsheet when a speed bump that is associated with a position in the spreadsheet is within a predetermined position.

18. The computer-readable storage medium of claim 15, further comprising:
 determining when the spreadsheet is shaken and performing at least one of:
  clearing a filter on a spreadsheet object; and
  performing a gravity sort that sorts spreadsheet data based on a weight of the spreadsheet objects.

19. A system for interacting with a spreadsheet, comprising:
 a processor, memory, and a computer-readable storage medium;
 an operating environment stored on the computer-readable storage medium and executing on the processor;
 a spreadsheet application;
 a spreadsheet, wherein the spreadsheet comprises spreadsheet objects; and
 a gesture manager operating in conjunction with the spreadsheet application that is configured to perform actions comprising:
  determining when a gesture on a touch input device is received, wherein the received gesture is used to interact with the spreadsheet;
  determining when sensor information is received that relates to a movement of the spreadsheet, wherein the sensor information comprises accelerometer data;
  using the accelerometer data to perform one of:
   a zoom out operation with respect to the spreadsheet in response to moving the touch input device in a first direction, and
   a zoom in operation with respect to the spreadsheet in response to moving the touch input device in a second direction,
   wherein the zoom out operation and the zoom in operation slow at one or more predetermined locations within the spreadsheet, wherein the one or more predetermined locations are prepositioned within the spreadsheet based at least in part on an arrangement of data within the spreadsheet;
  automatically determining a type of the received gesture when received with respect to the spreadsheet;
  performing an action in response to the determined type of the received gesture with respect to the spreadsheet, wherein performing the action in response to the determined type of the received gesture comprises performing actions selected from the group of: performing a first action in response to the spreadsheet receiving a karate chop gesture, performing a second action in response to the spreadsheet receiving a chart gesture, performing a third action in response to the spreadsheet receiving a comment gesture, performing a fourth action in response to the spreadsheet receiving a grip gesture, performing a fifth action in response to the spreadsheet receiving a gesture in a gesture box, and performing a sixth action in response to the spreadsheet receiving a sort gesture; and
  updating a display of the spreadsheet.

20. The system of claim 19, further comprising:
 determining when the spreadsheet is tilted;
 determining when the spreadsheet is rotated;
 determining when the spreadsheet is shaken; and
 wherein performing the action comprises at least one of:
  displaying spreadsheet objects in the spreadsheet spilling to a top of the spreadsheet;
  scrolling the spreadsheet;
  reversing a direction of displayed data;
  changing a sorting of data; and
  changing a view type of the spreadsheet.

* * * * *